(12) United States Patent
Okada et al.

(10) Patent No.: US 9,167,170 B2
(45) Date of Patent: Oct. 20, 2015

(54) IMAGING DEVICE AND CONTROL METHOD

(71) Applicant: Sony Corporation, Minato-ku (JP)

(72) Inventors: Shunji Okada, Kanagawa (JP); Kazuaki Iguchi, Tokyo (JP); Satoshi Shinohara, Tokyo (JP); Yoshitsugu Nomiyama, Kanagawa (JP); Naoya Katoh, Chiba (JP); Yukio Isobe, Kanagawa (JP); Yuuji Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 13/965,555

(22) Filed: Aug. 13, 2013

(65) Prior Publication Data
US 2014/0063286 A1    Mar. 6, 2014

(30) Foreign Application Priority Data

Aug. 31, 2012 (JP) ................................. 2012-192571

(51) Int. Cl.
*H04N 5/222* (2006.01)
*H04N 5/235* (2006.01)
*H04N 5/225* (2006.01)

(52) U.S. Cl.
CPC .......... *H04N 5/2353* (2013.01); *H04N 5/2256* (2013.01); *H04N 5/235* (2013.01); *H04N 5/2354* (2013.01)

(58) Field of Classification Search
CPC ... H04N 5/235; H04N 5/2354; H04N 5/2256; H04N 5/2353; G03B 15/16; G03B 7/16; G03B 15/03
USPC ........... 348/370–376; 396/153, 171, 173, 176
IPC ...... H04N 5/235, 5/2354, 5/2256; G03B 15/16, G03B 7/16, 15/03
See application file for complete search history.

(56) References Cited

U.S. PATENT DOCUMENTS

2008/0175580 A1* 7/2008 Kita .............................. 396/164
2010/0284675 A1* 11/2010 Machida et al. .............. 396/106

FOREIGN PATENT DOCUMENTS

JP     2007-142625    6/2007

* cited by examiner

*Primary Examiner* — Yogesh Aggarwal
(74) *Attorney, Agent, or Firm* — Sony Corporation

(57) ABSTRACT

There is provided an imaging device including an imaging element that acquires a captured image of a subject, a light emission unit that emits light to the subject, and a control unit that is capable of controlling a timing of exposure performed by the imaging element and a timing of light emission performed by the light emission unit. In a mode in which imaging is performed with a plurality of times of consecutive light emission by the light emission unit, the control unit controls at least one of a timing of the exposure and a timing of the light emission so that light amounts effective for exposure in each imaging are substantially the same.

13 Claims, 22 Drawing Sheets

FIG. 1
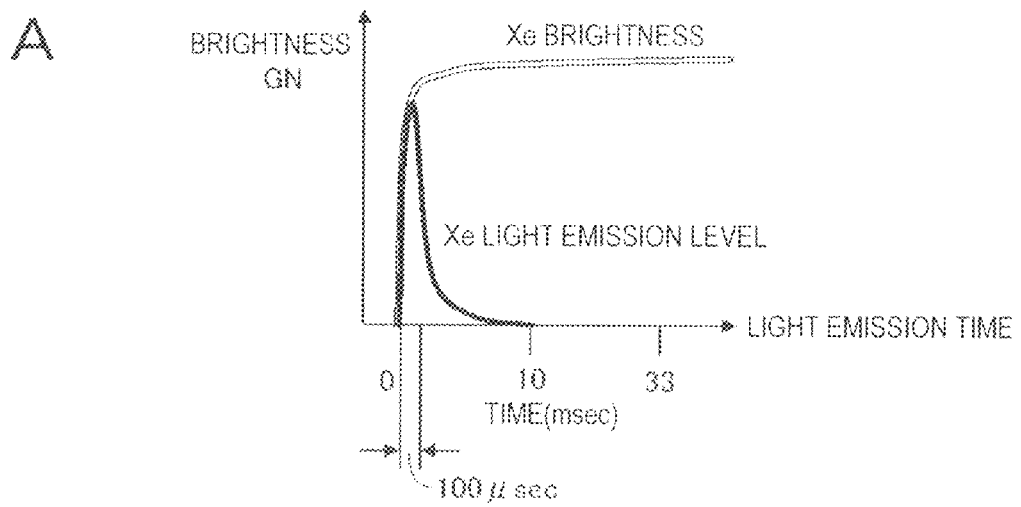
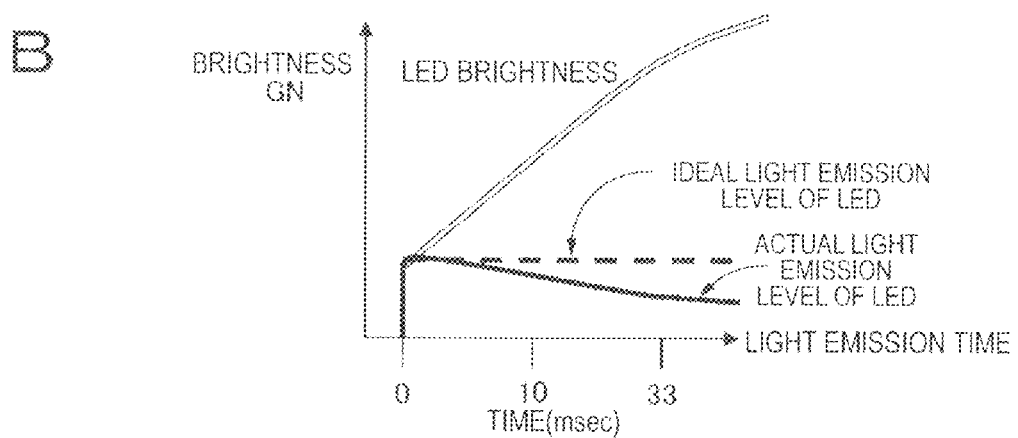

FIG. 13

| SHUTTER SPEED (s) | 1/4s | 1/8s | 1/15s | 1/30s | 1/60s | 1/100s | 1/125s | 1/200s |
|---|---|---|---|---|---|---|---|---|
| EXPOSURE PERIOD (ms) | 250ms | 125ms | 66.6ms | 33.3ms | 16.6ms | 10.0ms | 8.25ms | 5.00ms |
| LIGHT EMISSION PERIOD (ms) | 5ms | 5ms | 5ms | 5ms | 5ms | 5ms | 5ms | 5ms |
| CAPTURE INTERVAL (ms) | 350ms | 250ms | 200ms | 100ms | 100ms | 100ms | 100ms | 100ms |
| TOTAL TIME (ms) | 2000ms | 1375ms | 1067ms | 533.3ms | 515.6ms | 510ms | 506.5ms | 505ms |

FIG. 14

| ITEM | SS 1/30<br>DECREASE IN LIGHT AMOUNT -30%<br>SIX TIMES OF LIGHT EMISSION | SS 1/4<br>DECREASE IN LIGHT AMOUNT -5%<br>SIX TIMES OF LIGHT EMISSION |
|---|---|---|
| CAPTURE INTERVAL | 100ms | 350ms |
| FIRST LED LIGHT EMISSION | OVERLAP PERIOD 3.5ms<br>SHIFT AMOUNT 1.5ms | OVERLAP PERIOD 3.5ms<br>SHIFT AMOUNT 1.5ms |
| SECOND LED LIGHT EMISSION | OVERLAP PERIOD 4.3ms<br>SHIFT AMOUNT 0.7ms | OVERLAP PERIOD 4.9ms<br>SHIFT AMOUNT 0.1ms |
| THIRD LED LIGHT EMISSION | OVERLAP PERIOD 4.6ms<br>SHIFT AMOUNT 0.4ms | OVERLAP PERIOD 4.9ms<br>SHIFT AMOUNT 0.1ms |
| FOURTH LED LIGHT EMISSION | OVERLAP PERIOD 4.8ms<br>SHIFT AMOUNT 0.2ms | OVERLAP PERIOD 5.0ms<br>SHIFT AMOUNT 0.0ms |
| FIFTH LED LIGHT EMISSION | OVERLAP PERIOD 4.9ms<br>SHIFT AMOUNT 0.1ms | OVERLAP PERIOD 5.0ms<br>SHIFT AMOUNT 0.0ms |
| SIXTH LED LIGHT EMISSION | OVERLAP PERIOD 5.0ms<br>SHIFT AMOUNT 0.0ms | OVERLAP PERIOD 5.0ms<br>SHIFT AMOUNT 0.0ms |

FIG. 15
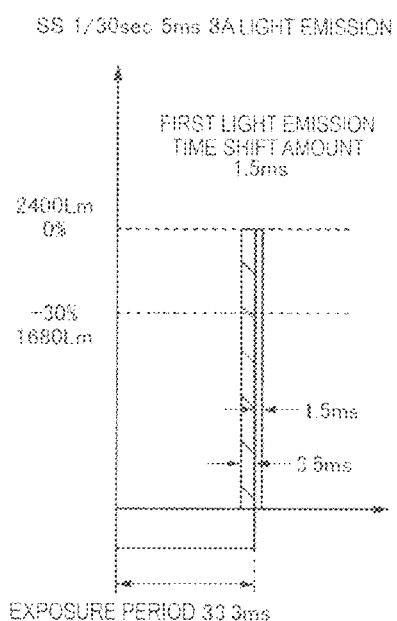
A
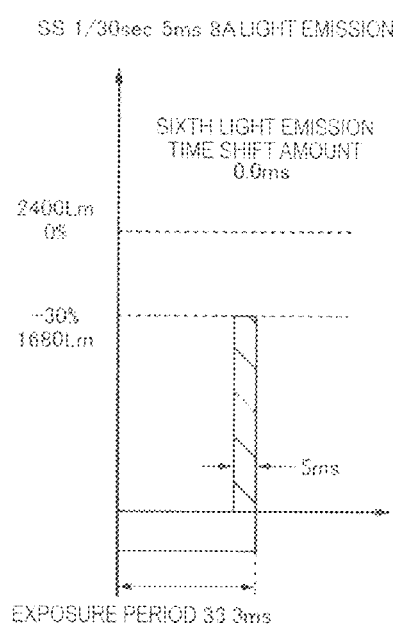
B

FIG. 16
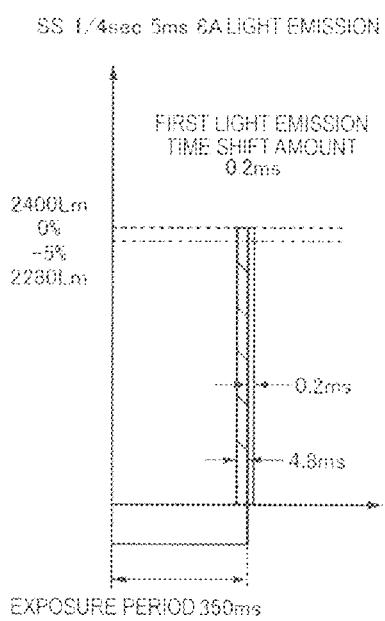
A
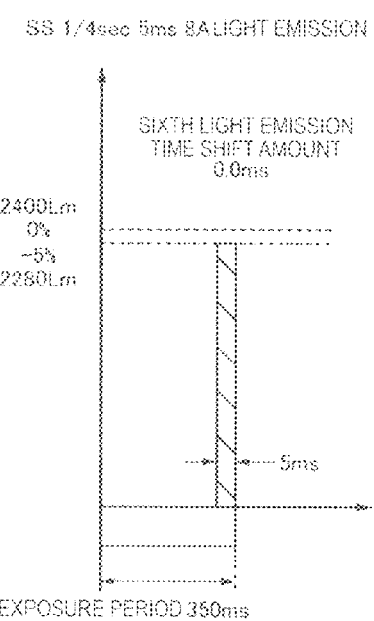
B

FIG. 17

| SHUTTER SPEED (s) | 1/4s | 1/8s | 1/15s | 1/30s | 1/60s | 1/100s | 1/125s | 1/200s |
|---|---|---|---|---|---|---|---|---|
| EXPOSURE PERIOD (ms) | 250ms | 125ms | 66.6ms | 33.3ms | 16.6ms | 10.0ms | 8.25ms | 5.0ms |
| LIGHT EMISSION PERIOD (ms) | 10ms | 10ms | 10ms | 10ms | 10ms | 10ms | | |
| CAPTURE INTERVAL (ms) | 350ms | 250ms | 200ms | 150ms | 150ms | 150ms | 150ms | 150ms |
| TOTAL TIME (ms) | 2030ms | 1375ms | 1067ms | 783ms | 765.6ms | 760ms | | |

FIG. 18

| ITEM | SS 1/30<br>DECREASE IN LIGHT AMOUNT -30%<br>SIX TIMES OF LIGHT EMISSION | SS 1/4<br>DECREASE IN LIGHT AMOUNT -5%<br>SIX TIMES OF LIGHT EMISSION |
|---|---|---|
| CAPTURE INTERVAL | 100ms | 350ms |
| FIRST LED LIGHT EMISSION | OVERLAP PERIOD 7.0ms<br>SHIFT AMOUNT 3.0ms | OVERLAP PERIOD 9.6ms<br>SHIFT AMOUNT 0.4ms |
| SECOND LED LIGHT EMISSION | OVERLAP PERIOD 8.6ms<br>SHIFT AMOUNT 1.4ms | OVERLAP PERIOD 9.8ms<br>SHIFT AMOUNT 0.2ms |
| THIRD LED LIGHT EMISSION | OVERLAP PERIOD 9.2ms<br>SHIFT AMOUNT 0.8ms | OVERLAP PERIOD 9.9ms<br>SHIFT AMOUNT 0.1ms |
| FOURTH LED LIGHT EMISSION | OVERLAP PERIOD 9.6ms<br>SHIFT AMOUNT 0.4ms | OVERLAP PERIOD 10.0ms<br>SHIFT AMOUNT 0.0ms |
| FIFTH LED LIGHT EMISSION | OVERLAP PERIOD 9.8ms<br>SHIFT AMOUNT 0.2ms | OVERLAP PERIOD 10.0ms<br>SHIFT AMOUNT 0.0ms |
| SIXTH LED LIGHT EMISSION | OVERLAP PERIOD 10.0ms<br>SHIFT AMOUNT 0.0ms | OVERLAP PERIOD 10.0ms<br>SHIFT AMOUNT 0.0ms |

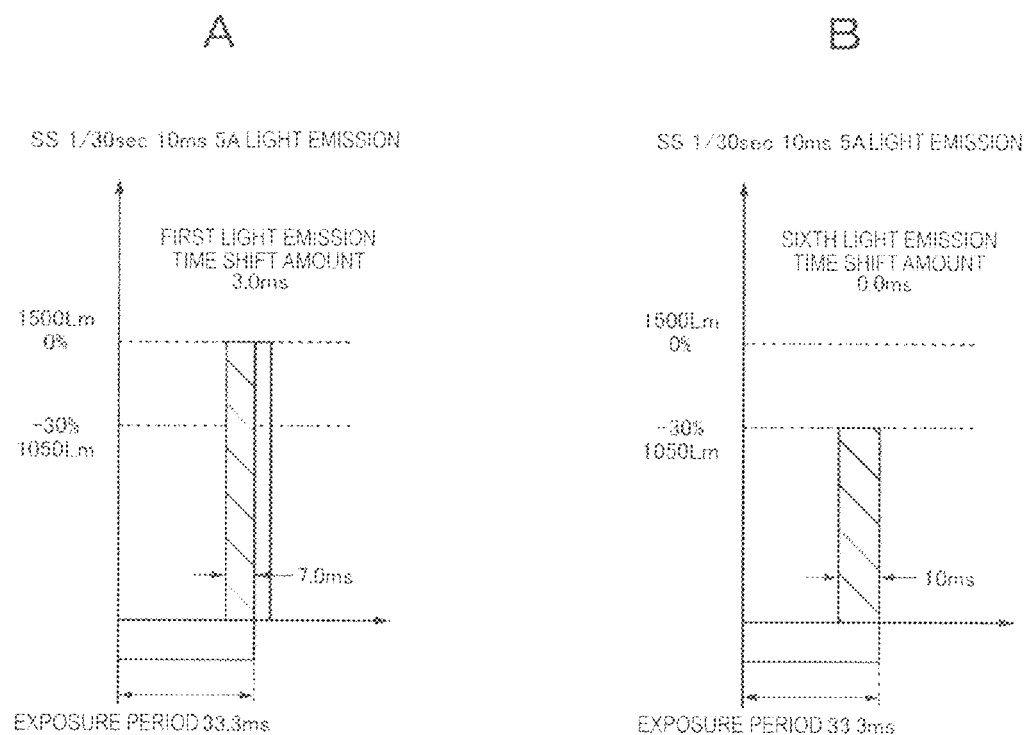

IMAGING DEVICE AND CONTROL METHOD

BACKGROUND

The present disclosure relates to an imaging device and a control method.

Strobe light emitting devices have been installed in imaging devices called single lens reflex cameras, lens exchange type cameras, and the like as auxiliary light for imaging. Most light emitting sources of such strobe light emitting devices use xenon tubes. In strobe light emitting devices using such xenon tubes, a high voltage is repeatedly applied thereto due to consecutive light emission synchronous with consecutive imaging. For this reason, it is necessary to provide a structure which enables prevention of burning damage caused by ultraviolet rays heating a condensing lens and a resin of a supporting member and enables dissipation of high heat, and thus an increase in size of the devices is unavoidable. For this reason, strobe light emitting devices built in imaging devices as imaging auxiliary light have failed to respond to consecutive light emission synchronous with consecutive imaging. Thus, an imaging device using LEDs (Light Emitting Diodes) as a light emitting source has been proposed. LEDs have a characteristic in that the light emission level (luminance) thereof decreases according to consecutive light emission. Japanese Unexamined Patent Application Publication No. 2007-142625 discloses a technique for compensating for a decrease in the light emission level of LEDs by lengthening a light emission period of the LEDs.

SUMMARY

It is necessary in the technique disclosed in Japanese Unexamined Patent Application Publication No. 2007-142625 to respectively measure the light emission levels of LEDs emitting light a plurality of times during consecutive photographing. The measurement is control to change the light amount of a certain light emission period serving as a reference even though a decrease in the light amount in the next light emission period is predicted in advance based on prediction of the light amount of the certain light emission period for a plurality of times of consecutive light emission synchronous with high-speed consecutive photographing. For this reason, there is a problem in that, as the control is performed with accuracy, the light amount in the certain light emission period serving as a reference is necessary many times. Furthermore, it is necessary to control predicting of the light amount of the certain light emission period and then predicting of a decrease in the light amount of the next light emission period during consecutive light emission in order to avoid the problem. Besides, there is another problem in that controlling a light emission time of LEDs consecutively emitting light for a short period of time is complicated.

Therefore, it is desirable to provide an imaging device and a control method that can easily suppress irregularity in brightness of an image attributable to a decrease in the light emission level of a light emitting unit more simply and accurately than in the related art.

According to an embodiment of the present technology, there is provided an imaging device including an imaging element that acquires a captured image of a subject, a light emission unit that emits light to the subject, and a control unit that is capable of controlling a timing of exposure performed by the imaging element and a timing of light emission performed by the light emission unit. In a mode in which imaging is performed with a plurality of times of consecutive light emission by the light emission unit, the control unit controls at least one of a timing of the exposure and a timing of the light emission so that light amounts effective for exposure in each imaging are substantially the same.

According to an embodiment of the present technology, there is provided an imaging device including an imaging element that acquires a captured image of a subject, a light emission unit that emits light to the subject, and a control unit that controls an amount of light reaching an imaging plane of the imaging element. In a mode in which imaging is performed with a plurality of times of consecutive light emission by the light emission unit, the control unit controls the amount of light to increase as the number of times of imaging increases.

According to an embodiment of the present technology, there is provided a control method of an imaging device. In a mode in which imaging is performed with a plurality of times of consecutive light emission by a light emission unit, at least one of a timing of exposure and a timing of light emission is controlled so that light amounts effective for exposure in each imaging are substantially the same.

According to an embodiment of the present technology, there is provided a control method of an imaging device. In a mode in which imaging is performed with a plurality of times of consecutive light emission by a light emission unit, the amount of light reaching an imaging plane of an imaging element is controlled to increase as the number of times of imaging increases.

According to at least one embodiment of the present disclosure described above, irregularity in brightness of an image attributable to a decrease in the light emission level of a light emitting unit can be suppressed.

BRIEF DESCRIPTION OF THE DRAWINGS

FIG. 1A is a diagram for describing a light emission characteristic of a xenon tube, and FIG. 1B is a diagram for describing a light emission characteristic of an LED;

FIG. 13 is a diagram showing an example of specifications of an imaging device;

FIG. 14 is a diagram showing an example of shift amounts;

FIGS. 15A and 15B are diagrams for describing processes in which consecutive photographing is executed to photograph a scene on, for example, a bright street at night based on a shift amount in one exposure period;

FIGS. 16A and 16B are diagrams for describing processes in which consecutive photographing is executed to photograph a scene of, for example, complete darkness based on a shift amount in one exposure period;

FIG. 17 is a diagram showing another example of specifications of the imaging device;

FIG. 18 is a diagram showing another example of shift amounts;

FIGS. 19A and 19B are diagrams for describing processes in which consecutive photographing is executed to photograph a scene of, for example, a bright street at night based on a shift amount in one exposure period;

DETAILED DESCRIPTION OF THE EMBODIMENT(S)

Figure 2:
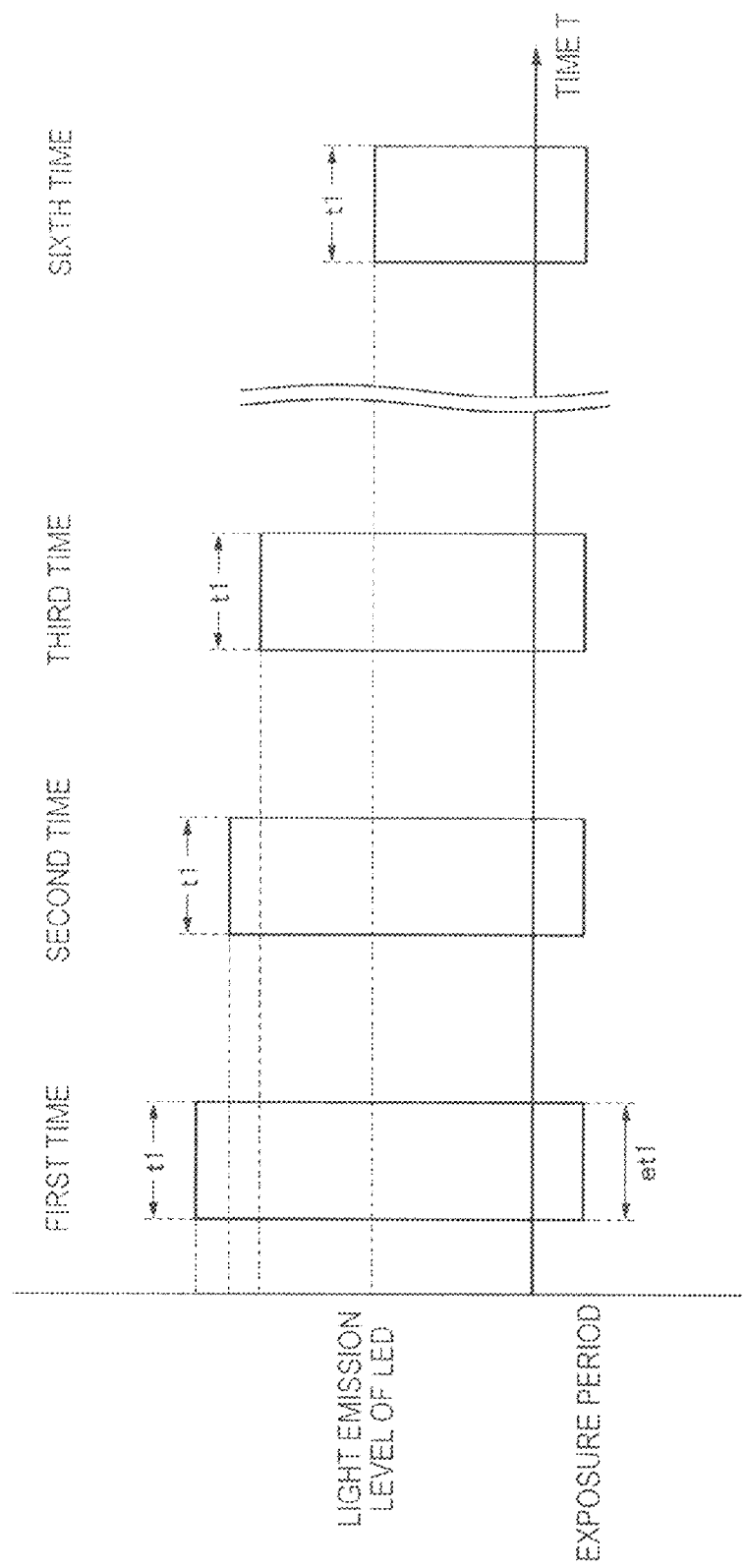
FIG. 2 is a diagram showing an example of a relationship between changes of the light emission level of an LED and exposure periods in synchronized consecutive photographing.

Hereinafter, preferred embodiments of the present disclosure will be described in detail with reference to the appended drawings. It should be noted that description will be provided in the following order.
<1. First embodiment>
<2. Second embodiment>
<3. Modified example>

It should also be noted that embodiments and the equivalents thereof described below are preferred specific examples of the present technology, and the content of the present technology is not limited to the embodiments and the equivalents thereof.
<1. First Embodiment>
[Characteristics of a Light Emitting Element]

First, characteristics of a light emitting element will be described for easy understanding of the present technology. As a light emitting element, for example, LEDs are used in the present technology. A light emitting element is not limited to LEDs. The present technology can be applied to, for example, an element of which the light emission level is lowered due to heat generation.

FIG. 1A shows an example of a light emission characteristic of a xenon tube, and FIG. 1B shows an example of a light emission characteristic of an LED. Since the xenon tube uses gaseous discharge, the light emission level thereof sharply increases in a moment (for example, 100 microseconds (μsec)) after light is emitted. In addition, after the light emission level reaches a predetermined peak value, the light emission level rapidly decreases, and then the light emission is completed in about 2 milliseconds. For this reason, the light mission amount (guide number (GN)) of the xenon tube becomes substantially constant after it increases to a predetermined value. Here, a guide number GN corresponds to a value obtained by integrating a light emission level with a time. On the other hand, since the light emission level of an LED is maintained substantially constant from the start of light emission as shown in FIG. 1B, and the guide number of the LED has a characteristic of being proportional to time. For this reason, brightness of light emission of LEDs can be easily controlled through relatively occasional control at an interval of about 1 ms (millisecond).

Although an ideal light emission level of an LED is substantially constant, if an LED consecutively emits light, a semiconductor junction unit of the LED generates heat due to a current flowing at the moment of light emission, causing an increase in a temperature thereof. As the current flowing at the moment of light emission becomes higher, heat generation increases. It is preferable to dissipate heat from the heat generation, but when an interval between a plurality of times of light emission by the LED is short, for example, heat dissipation is not effective. When a temperature of the LED exceeds the limit set in specifications thereof, the light emission level of the LED decreases (refer to FIG. 1B). This is called a drooping phenomenon. Furthermore, when the light emission level of an LED decreases due to heat generation, a color temperature of the LED is shifted to a high color temperature of black-body radiation (unit: K (kelvin)).
[Synchronized Consecutive Photographing]

LEDs are applied to, for example, imaging devices as a flash. Here, a case in which consecutive imaging is performed using LEDs as a flash will be considered. It should be noted that photographing consecutively performed by causing LEDs to consecutively emit light plural times in synchronization (synchronous) with exposure timings at a shutter speed synchronous with the light emission of the LEDs is called synchronized consecutive photographing. The synchronized consecutive photographing can be set as one mode in an imaging device.

FIG. 2 shows an example of the relationship between a light emission period of an LED and an exposure period in synchronized consecutive photographing. In the synchronized consecutive photographing, the LED emits light, for example, six times. Of course, the number of times of light emission of the LED can be appropriately changed to be eight times, ten times, or the like. A light emission period t1 of the LED each time is uniform, or approximately uniform.

In the synchronized consecutive photographing, exposure is performed according to light emission of the LED. When a focal plane shutter having a leading curtain and a trailing curtain is used as a shutter of an imaging device, for example, it is necessary to cause the LED to emit light synchronous with a period in which an entire imaging plane of an imaging element is open. Hence, the shutter speed in the synchronized consecutive photographing should be faster than the shutter speed at the moment when the entire imaging plane of the imaging element is open. The shortest (fastest) shutter speed that enables the synchronized consecutive imaging is called a synchronous speed. An exposure period et1 in FIG. 2 is set to be equal to or longer than the light emission period t1.

As shown in FIG. 2, the light emission level of the LED decreases as the number of times of light emission increases due to heat generation thereof, or the like. The light emission level of the LED decreases in an exponential manner. Due to the decrease in the light emission level of the LED, the light amount effective for exposure reduces. For this reason, brightness of image data obtained from imaging each time varies.

Figure 3:
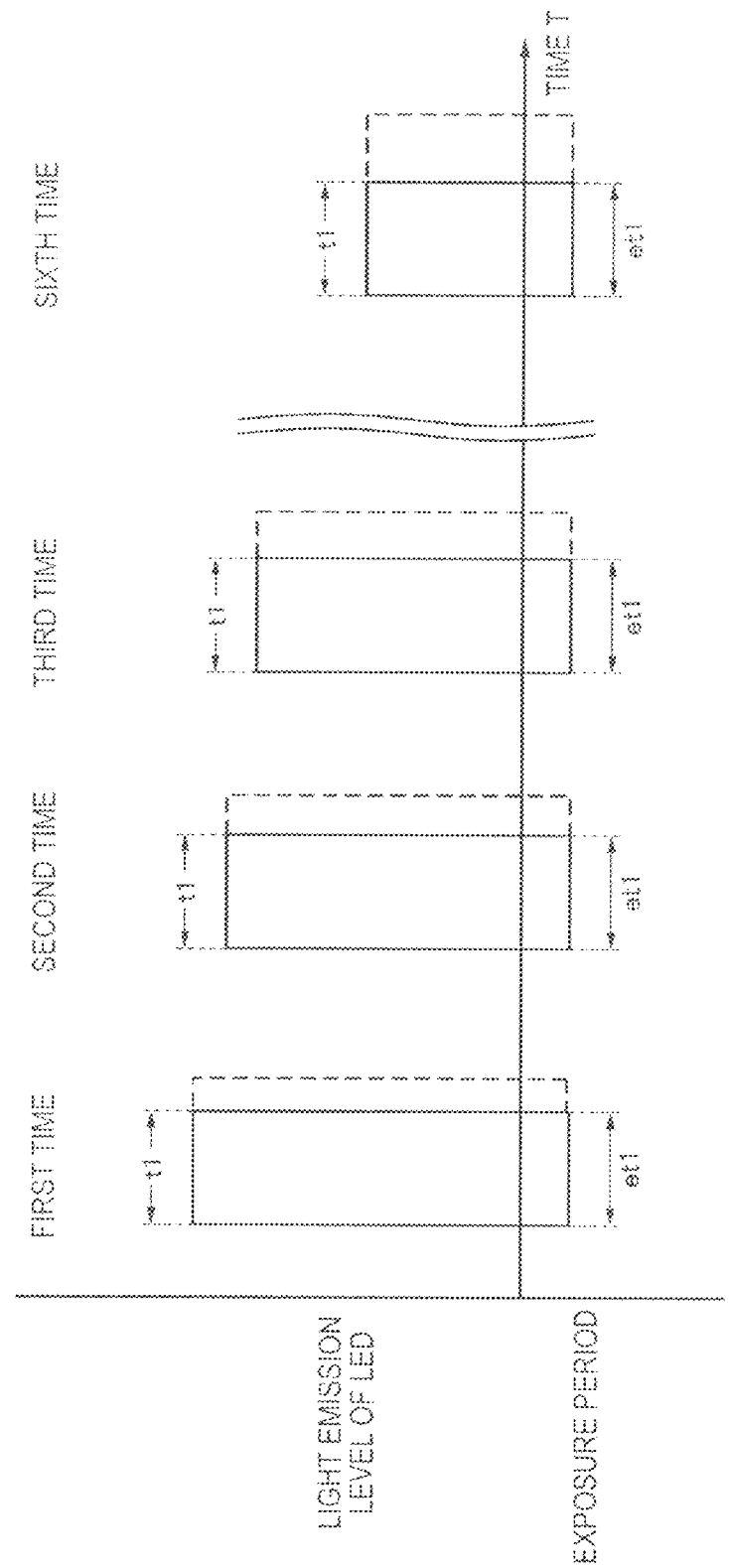
FIG. 3 is a diagram for describing a process for changing the light emission period of an LED and an exposure period.

Thus, as shown in FIG. 3, compensating for the decrease in the light emission level of the LED by lengthening the light emission period of the LED and the exposure period in each time of imaging is considered. However, changing the light emission period of the LED that consecutively emits light for a short period of time and the exposure period in each time of imaging is difficult to control.

Figure 4:
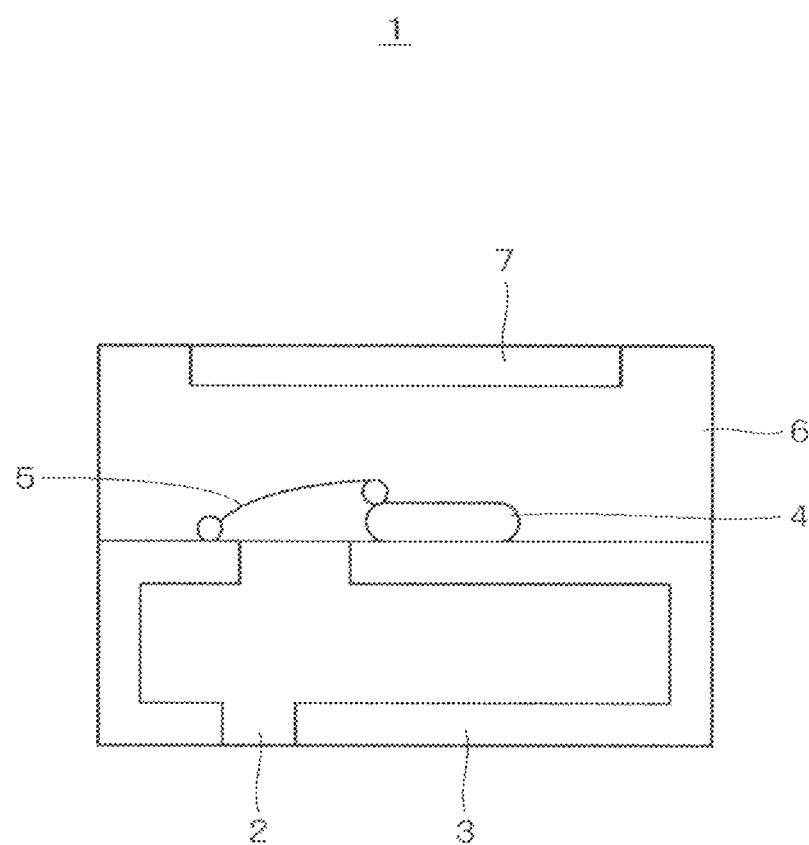
FIG. 4 is a diagram showing an example of a configuration of an LED chip.

Furthermore, changing a heat dissipating physical structure is considered. FIG. 4 shows an example of a configuration of an LED chip 1. A copper electrode 3 is formed as a pattern of a substrate 2. The copper electrode 3 is connected to an ultraviolet (UV) light emission semiconductor 4 by a Au (gold) wire 5. The ultraviolet light emission semiconductor 4 is housed in a case 6. A yellow phosphor 7 is attached onto one face of the case 6. Thus, the LED appears to emit white light due to the combination of the emitted light color of the ultraviolet light emission semiconductor 4 and yellow light emitted from the yellow phosphor 7.

A heat dissipation property of the LED chip can be enhanced by, for example, increasing the thickness of the copper electrode 3. However, it is also difficult to prevent the light emission level of the LED from decreasing in this case due to heat generation. Thus, in the present technology, irregularity in brightness of an image caused by a decrease in the light emission level of an LED is prevented through easier control. Hereinafter, the content of the present technology will be described in detail. It should be noted that the configuration exemplified in FIG. 4 may be adopted as a configuration of an LED in the present technology, but the configuration is not necessarily limited thereto.

[Regarding an Imaging Device]

Figure 5:
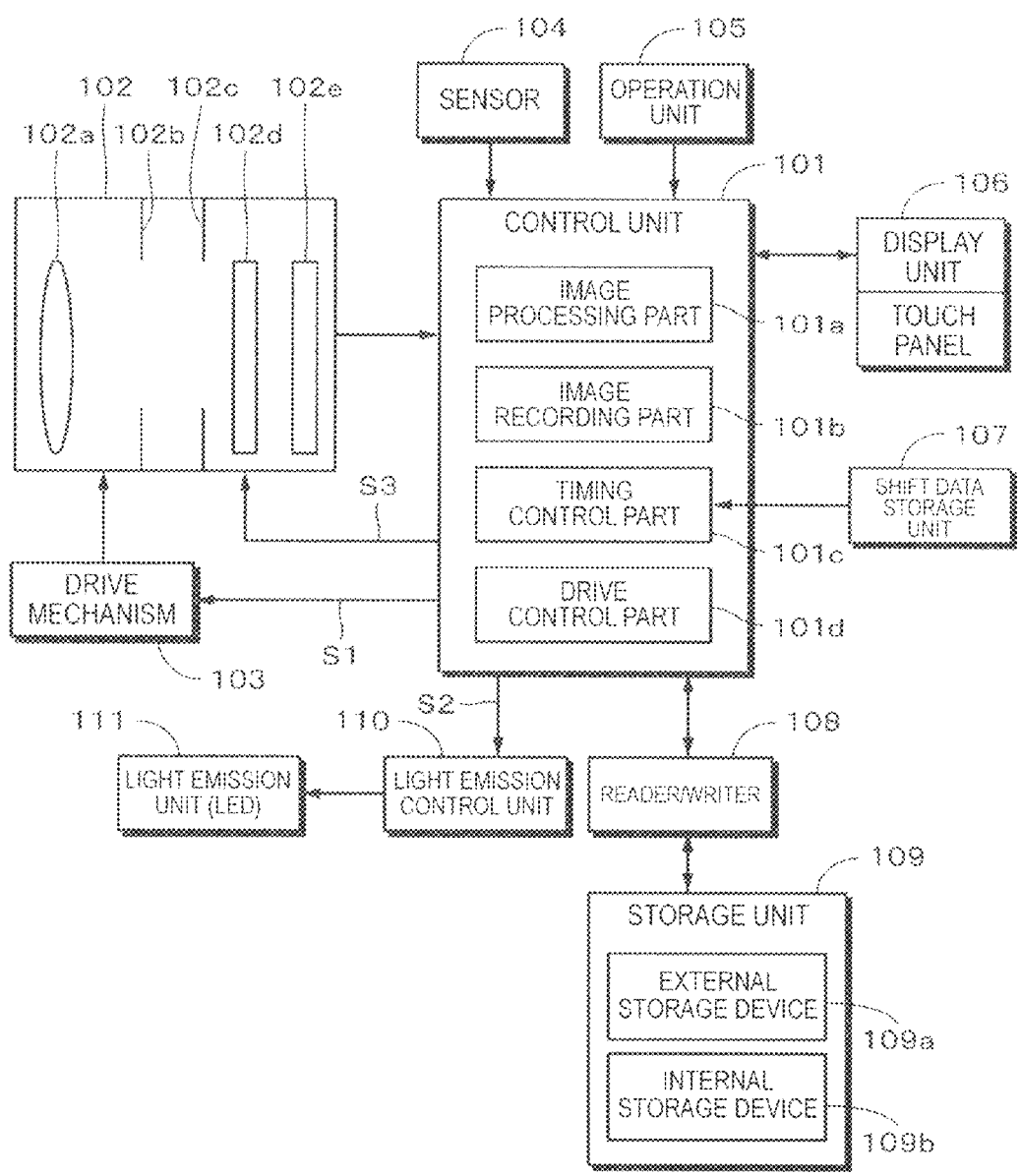
FIG. 5 is a block diagram showing an example of a configuration of an imaging device.

FIG. 5 shows an example of a configuration of an imaging device according to the present technology. The imaging device 100 is configured as, for example, a digital still camera. The function of the imaging device 100 may be regarded as one of functions of a mobile terminal such as a mobile telephone, a smartphone, or the like. It should be noted that an LED can be disposed in an arbitrary position of the body portion of the imaging device 100 as long as the position is proper for emitting light toward subjects.

The imaging device 100 includes a control unit 101, an imaging optical system 102, a drive mechanism 103, a sensor 104, an operation unit 105, a display unit 106, a shift data storage unit 107, a reader/writer 108, a storage unit 109, a light emission control unit 110, and a light emitting unit (LED) 111.

The control unit 101 includes an imaging processing part 101a, an image recording part 101b, a timing control part 101c, and a drive control part 101d as functions thereof. Hardware that executes the functions of the control unit 101 may be provided separately from the control unit 101. Some of the functions of the control unit 101 may be set in other constituent elements such as the light emission control unit 110.

The imaging optical system 102 includes, for example, one or more lenses 102a, a diaphragm 102b, a shutter 102c, an ND (Neutral Density) filter 102d, and an imaging element 102e that is an example of an imaging unit. Hereinafter, each unit of the imaging device 100 will be described.

The control unit 101 is a processing device that includes a processor, a memory, and the like, and is configured as a digital signal processor (DSP) or a CPU (Central Processing Unit). The control unit 101 controls each unit of the imaging device 100, and executes processes according to operations performed on the operation unit 105.

Programs for performing various arithmetic operation processes and control of each unit of the imaging device 100 are stored in, for example, a RAM (Random Access Memory) and a ROM (Read-Only Memory) included in the control unit 101, a memory connected to the control unit 101, or the like. The RAM, and the like are not illustrated in the drawing.

The image processing part 101a executes an analog signal process and a digital signal process on image data supplied from the imaging element 102e of the imaging optical system 102. The analog signal process includes a correlated double sampling (CDS) process, an automatic gain control (AGC) process, an A/D (Analog to Digital) conversion process, and the like. The AGC process is to appropriately control gain, and thereby to control ISO sensitivity.

The digital signal process includes a white balance process, an interpolation process, a gamma correction process, a color correction process, a contour correction process, a grayscale reproduction process, a noise reduction process, and the like. The white balance process may be included in the color correction process. The noise reduction process may be performed on image data at the stage of raw data, or may be performed after image data is converted into a predetermined format. The grayscale reproduction process includes, for example, a process for optimizing a dynamic range, or a process for adjusting the degree of acuteness of an image.

The image recording part 101b compresses image signals that have undergone a signal process by the image processing part 101a in a compression coding scheme, for example, JPEG (Joint Photographic Experts Group), or the like, and thereby generates compressed image data. The compressed image data generated by the image recording part 101b is stored in, for example, the storage unit 109.

The timing control part 101c reads predetermined correction data from the shift data storage unit 107. The timing control part 101c sets an amount of timing shift described in the read correction data in the drive control part 101d.

The drive control part 101d supplies a drive control signal S1 to the drive mechanism 103 and supplies a light emission control signal S2 to the light emission control unit 110 according to a predetermined operation performed on the operation unit 105. The predetermined operation is, for example, an operation for executing synchronized consecutive photographing. A timing at which the drive control signal S1 is supplied to the drive mechanism 103 and a timing at which the light emission control signal S2 is supplied to the light emission control unit 110 are decided according to an amount of shift set by the timing control part 101c.

The drive mechanism 103 controls, for example, opening and closing of a shutter at a predetermined speed according to the supply of the drive control signal S1. The light emission control unit 110 is operated according to the supply of the light emission control signal S2, and the LED 111 accordingly emits light.

Furthermore, as the control unit 101 supplies a control signal S3 to the imaging optical system 102, a so-called electronic shutter that realizes the electronic functions of the ND filter 102d and the shutter can be controlled.

Details of the processes performed by the timing control part 101c and the drive control part 101d will be described later.

The drive mechanism 103 collectively refers to mechanisms controlling movements of the lenses 102a, mechanical operations of the diaphragm and the shutter, and the like. The drive mechanism 103 is operated according to the drive control signal S1 supplied from the control unit 101. For example, as the drive mechanism 103 is operated, the lenses 102a move in an optical axis direction, and thereby focus is controlled. Furthermore, as the drive mechanism 103 is operated, the diaphragm 102b is controlled, and thereby incident subject light is controlled.

The sensor 104 includes, for example, a gyro sensor. Sensor information obtained by the sensor 104 is supplied to the control unit 101. The control unit 101 generates the drive control signal S1 for correcting camera-shake based on the supplied sensor information. The drive control signal S1 is supplied to the drive mechanism 103. The drive mechanism 103 moves the lenses 102a and the imaging element 102e into a plane orthogonal to an optical axis according to the drive control signal S1. Accordingly, optical camera-shake correction is realized.

The operation unit 105 includes various buttons of a function button group, a shutter button, and the like disposed on the imaging device 100. The operation unit 105 functions as a user interface for operating the imaging device 100. The operation unit 105 may include a remote control operation device such as a remote controller. An operation signal is generated according to an operation performed on the operation unit 105, and the generated operation signal is output to the control unit 101.

The display unit 106 is a display device such as a liquid crystal display or an organic EL (Electroluminescence) display. The display unit 106 is configured as, for example, a touch panel that is a user interface for operating the imaging device 100. The display unit 106 displays a screen for setting a desired mode, a through-image, a reproduced image obtained by performing a reproduction process on a captured image, or the like.

The shift data storage unit 107 retains, for example, a table in which amounts of shift timings are defined. A specific example of shift data stored in the shift data storage unit 107 will be described.

The reader/writer 108 is an auxiliary device performing writing of data onto and reading of data from the storage unit 109, and functions as an interface for the storage unit 109.

The storage unit 109 includes, for example, an external storage device 109a that can be freely attached to or detached from the imaging device 100, and an internal storage device 109b that is fixed to an inner portion of the imaging device 100. As recording media applied to the external storage device 109a and the internal storage device 109b, for example, there are a hard disk, a flash memory, an optical disc, a magneto-optical disc, and the like. Image data obtained from photographing is saved in the storage unit 109 via the reader/writer 108. A user can arbitrarily set, for example, in which a device between the external storage device 109a and the internal storage device 109b image data is to be saved.

Figure 6:
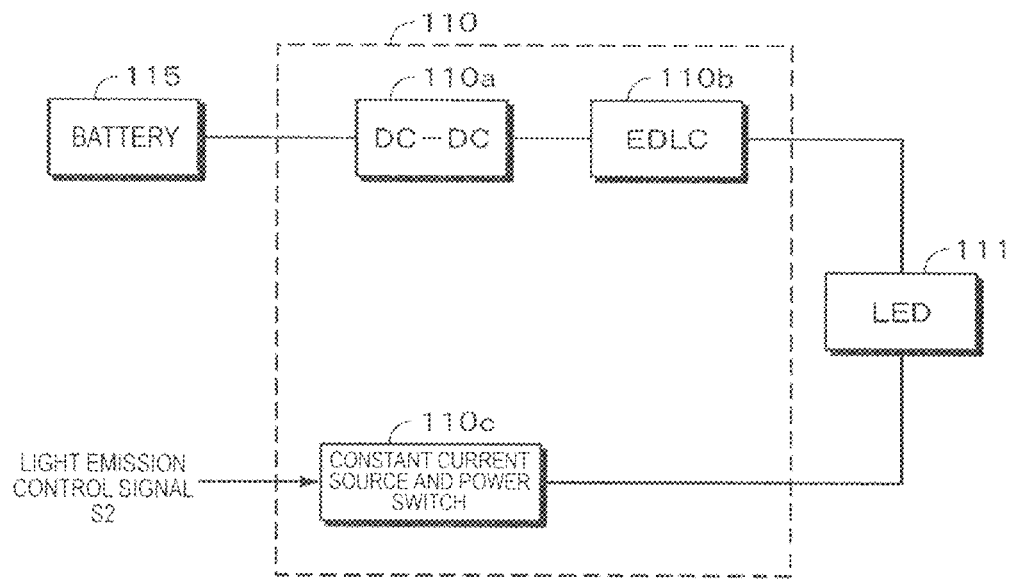
FIG. 6 is a block diagram showing an example of a configuration of a light emission control unit.

The light emission control unit 110 is operated based on the light emission control signal S2 supplied from the control unit 101. As the light emission control unit 110 is operated, the LED 111 emits light. The LED 111 includes one or more of LED elements. When a plurality of LED elements are used, the plurality of LED elements are connected in series or in parallel. Preferably, the plurality of LED elements are connected in parallel. FIG. 6 shows a configuration of the light emission control unit 110, and the like. The light emission control unit 110 includes, for example, a DC (Direct Current)-DC converter 110a, a low-resistance electric double-layer capacitor (EDLC) 110b, a constant current source and a power switch 110c. The DC-DC converter 110a boosts the voltage of a battery 115 such as a lithium-ion battery to a predetermined voltage. The boosted voltage is supplied to the electric double-layer capacitor 110b, and stored therein. Power may be supplied to each unit of the imaging device 100 from the battery 115.

The light emission control signal S2 supplied from the control unit 101 is supplied to the constant current source and the power switch 110c. The power switch is turned on according to the supply of the light emission control signal S2. As the power switch is turned on, the electric double-layer capacitor 110b is discharged, a drive current (for example, 2 A (ampere), 4 A, 8 A, or the like) per LED element from the constant current source flows in the LED 111, and the LED 111 thereby emits light. It should be noted that the drive method of the LED is not limited to the above-described example, and a method of the related art can be applied thereto. It should also be noted that the LED 111 includes two LED elements unless specified otherwise (a two-light structure). Furthermore, a light amount obtained from the LED 111, brightness (guide number) of a subject, and the like exemplified in the description below are measured values obtained from the two LED elements (two lights) when each of the LED elements is driven by a predetermined drive current.

The imaging optical system 102 will be described. The lenses 102a decide basic optical performance of brightness of exposure with lens brightness expressed by an F value. When the lenses 102a are driven for enlargement using zooming, an F value is lowered because an amount of light reaching the imaging element 102e in the latter stage reduces.

Focusing is controlled in the imaging device 100 by moving the lenses 102a in a direction along an optical axis. As auto-focus methods, a contrast detection method and a phase difference detection method have been proposed, but the phase difference detection method implemented at a higher speed than the contrast detection method is preferably used. Of course, other methods may be used to control auto-focus.

The diaphragm 102b has a function of adjusting a light amount in several stages. The shutter 102c is configured as, for example, a focal plane shutter. Opening and closing of the shutter 102c are controlled by the drive mechanism 103 in accordance with a shutter speed. For example, curtains having a predetermined slit width move to the upper and lower sides or to the right and left sides at a high speed.

The ND filter 102d adjusts an amount of light reaching the imaging plane of the imaging element 102e. The imaging element 102e is a CCD (Charge Coupled Device), a CMOS (Complementary Metal Oxide Semiconductor), or the like. When the CMOS is used as the imaging element, for example, a high-sensitivity one with double brightness sensitivity improved by 6 dB (decibel) is used by disposing a wiring layer on the back side of the imaging plane.

[Setting of a Synchronized Consecutive Photographing Mode]

Figure 7:
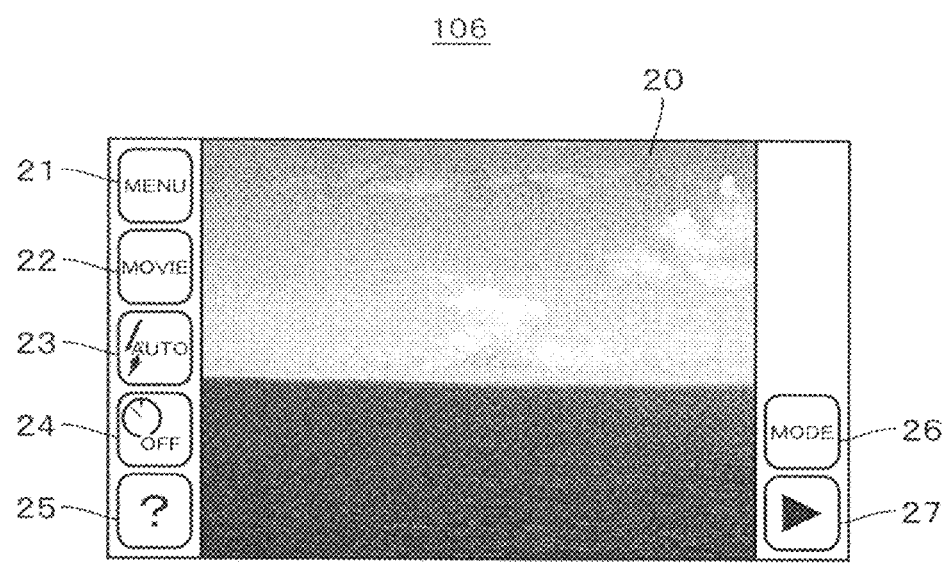
FIG. 7 is a diagram showing an example of display on a display unit.

An example of setting a synchronized consecutive photographing mode will be described. When the imaging device 100 is turned on, the display unit 106 displays, for example, the screen shown in FIG. 7. A through-image 20 is displayed at the center of the display unit 106, and a plurality of icons are displayed in the periphery of the through-image 20. When a user touches any icon using his or her finger, or the like, the function corresponding to the icon is executed.

For example, an icon 21 for causing a menu screen to be displayed, an icon 22 for setting a mode for photographing a moving image, an icon 23 for setting LED flash, an icon 24 for setting a self-timer, an icon 25 for displaying an operation guide, an icon 26 for setting a photographing mode, an icon 27 for reproducing still images and moving images stored in the storage unit 109, and the like are displayed on the display unit 106.

First, a user sets a still image mode in which still images are captured. When the still image mode is set as default when the imaging device 100 is turned on, no operation for setting the still image mode is necessary. Next, the user selects the icon 23 to set LED flash. The content displayed on the display unit 106 is shifted to the content shown in FIG. 8 by selecting the icon 23.

Figure 8:
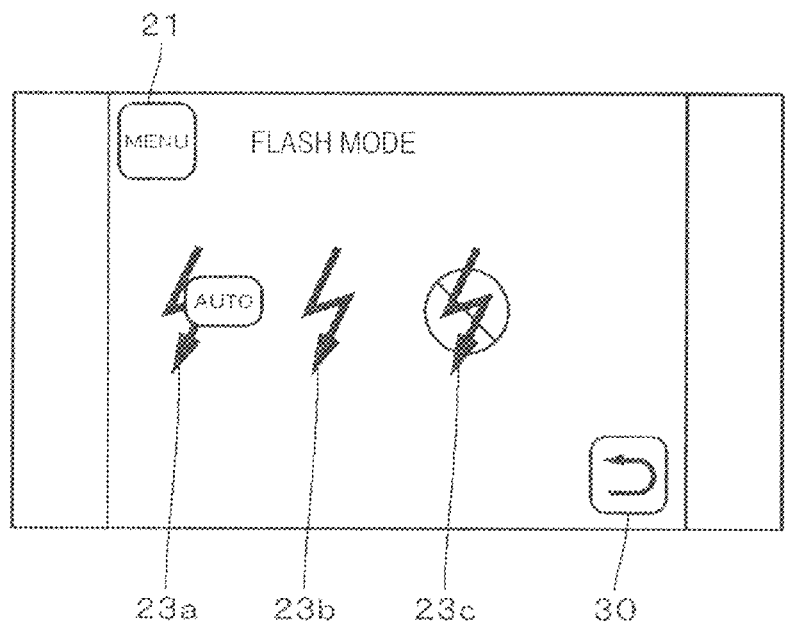
FIG. 8 is a diagram showing an example of display for setting an LED flash.

FIG. 8 shows a screen for setting light emission of the LED flash. For example, an icon 23a corresponding to a mode in which light emission or non-emission of the LED 111 is automatically controlled (auto mode), an icon 23b corresponding to a mode in which the LED 111 necessarily emits light (forcible light emission mode), and an icon 23c corresponding to a mode in which light emission of the LED 111 is prohibited (light emission prohibition mode) are displayed on the display unit 106. It should be noted that, in addition to the icons for setting flash, the icon 21 for causing the menu screen to be displayed, and an icon 30 for returning the content displayed on the display unit 106 to the previous screen are displayed on the display unit 106.

The user selects, for example, the icon 23b to set the flash mode to the forcible light emission mode. Then, the user selects the icon 21 to cause the menu screen to be displayed. Although not illustrated in the drawing, an icon for setting consecutive shooting is displayed on the menu screen.

Figure 9:
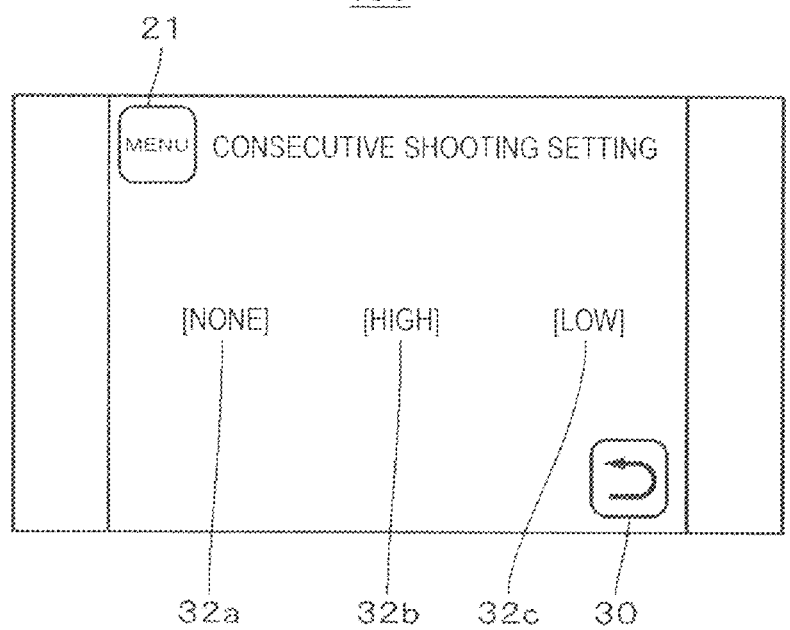
FIG. 9 is a diagram showing an example of display for setting consecutive shooting.

FIG. 9 shows an example of display of a screen when the icon for setting consecutive shooting is selected. When an icon 32a indicated by "none" is selected, photographing for one photo is performed. When an icon 32b indicated by "high" is selected, consecutive shooting at a speed of, for example, 6 frame/sec is performed. When an icon 32c indicated by "low" is selected, for example, consecutive shooting at a speed of, for example, 2 frames/sec is performed. Of course, the number of frames can be appropriately changed. In this example, performing consecutive shooting with 6 frames has been described.

When the mode of LED flash is set to forcible light emission and consecutive shooting is set, the synchronized consecutive photographing mode is set. In other words, the mode in which imaging is performed with a plurality of times of light emission by the LED 111 is set. The synchronized consecutive photographing may be set as one of the photographing modes, and a predetermined icon may be assigned to the synchronized consecutive photographing. The synchronized consecutive photographing may thereby be directly selected by selecting the icon.

Figure 10:
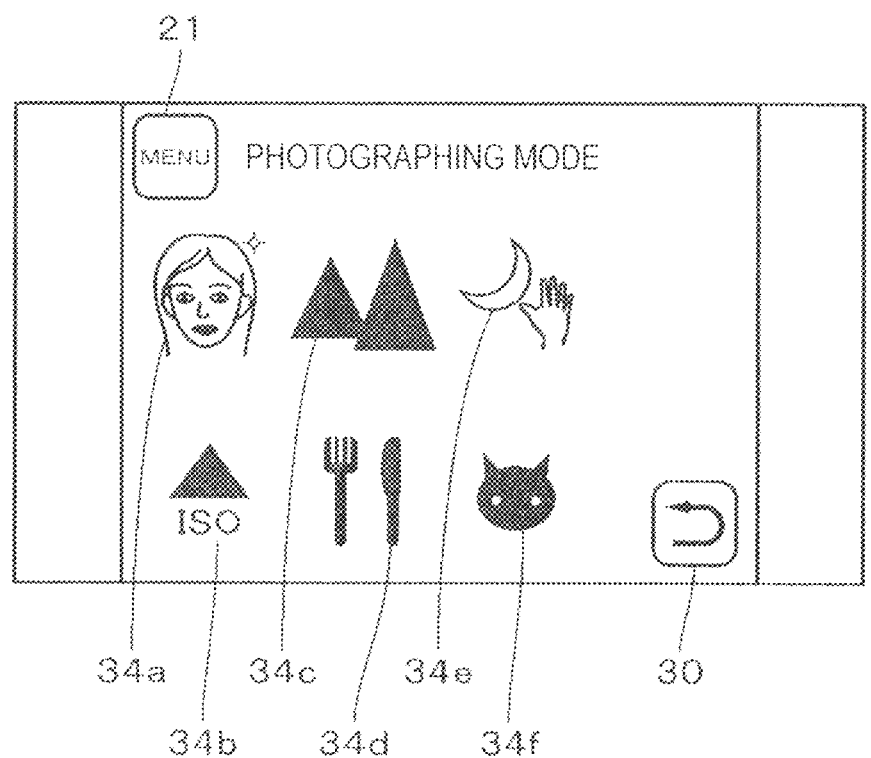
FIG. 10 is a diagram showing an example of display for setting photographing modes.

FIG. 10 shows an example of display when the icon 26 for setting a photographing mode is selected. Icons 34a, 34b, 34c, 34d, 34f, and 34e corresponding to each of the plurality of photographing modes are displayed on the display unit 106. The icon 34a is an icon corresponding to a mode called a beautiful skin mode. When the beautiful skin mode is set, the image processing part 101a performs an image process to cause the skin of a person who is a subject to look smooth. The icon 34b is a high sensitivity imaging mode in which blur is reduced without using LED flash even in a dark place.

The icon 34c is a mode in which scenery with the sky and trees is vividly photographed by focusing on remote scenery. The icon 34d is a mode in which food is photographed to look bright and delicious. The icon 34e is an icon corresponding to a mode called a handheld night view mode. When the icon 34e is selected to set the handheld night view mode, a night view with no noise can be photographed even without using a tripod. The icon 34f is a mode in which pets are photographed in an optimum setting. Of course, an icon corresponding to a different mode from the exemplified mode may be displayed on the display unit 106.

Here, when the handheld night view mode is set, the same operation as the synchronized consecutive photographing is performed. For example, imaging is performed with 6 times of consecutive light emission by the LED 111. A difference between imaging in the synchronized consecutive photographing mode and imaging in the handheld night view mode is, for example, an image process in the latter stage. For example, a predetermined image process is performed on six images obtained from the imaging in the synchronized consecutive photographing mode, and the images are stored in the storage unit 109. On the other hand, the six images obtained from the imaging in the synchronized consecutive photographing mode are used in a process, for example, for generating one image with reduced noise by overlapping the six images.

[An Example of an Operation of the Imaging Device]

An example of an operation performed by the imaging device 100 will be described. It should be noted that the imaging device 100 can perform known operations in addition to the operation exemplified below.

First, the synchronized consecutive photographing mode is set using the display unit 106. The timing control part 101c reads shift data from the shift data storage unit 107 according to the setting of the synchronized consecutive photographing mode. For example, shift data is read to cause a timing of light emission of the LED 111 to be shifted to be earlier or delayed. The shift data is data according to the number of times of light emission. When the LED 111 emits light six times in synchronized consecutive photographing, for example, the timing control part 101c reads shift data of the first time, shift data of the second time, shift data of the third time, shift data of the fourth time, shift data of the fifth time and shift data of the sixth time from the shift data storage unit 107.

The timing control part 101c sets the read shift data in the drive control part 101d. Then, the shutter button of the operation unit 105 is pressed, and an operation signal for instructing to perform synchronized consecutive photographing is supplied to the control unit 101. The drive control part 101d of the control unit 101 generates the drive control signal S1 so that exposure is performed for a period set in advance (0 of a shift amount), and supplies the generated drive control signal S1 to the drive mechanism 103. The drive mechanism 103 is operated according to the drive control signals S1 to cause the shutter 102c to be open or closed for a predetermined period, and then an exposure operation of a first time is performed.

The drive control part 101d further supplies the light emission control signal S2 to the light emission control unit 110 with a shift amount based on the set shift data at a shift timing. The light emission control unit 110 is operated according to the light emission control signal S2, and the LED 111 thereby emits light. Thereafter, the same process is performed two times, three times, ..., and six times.

[Specific Example of Operations]

Figure 11:
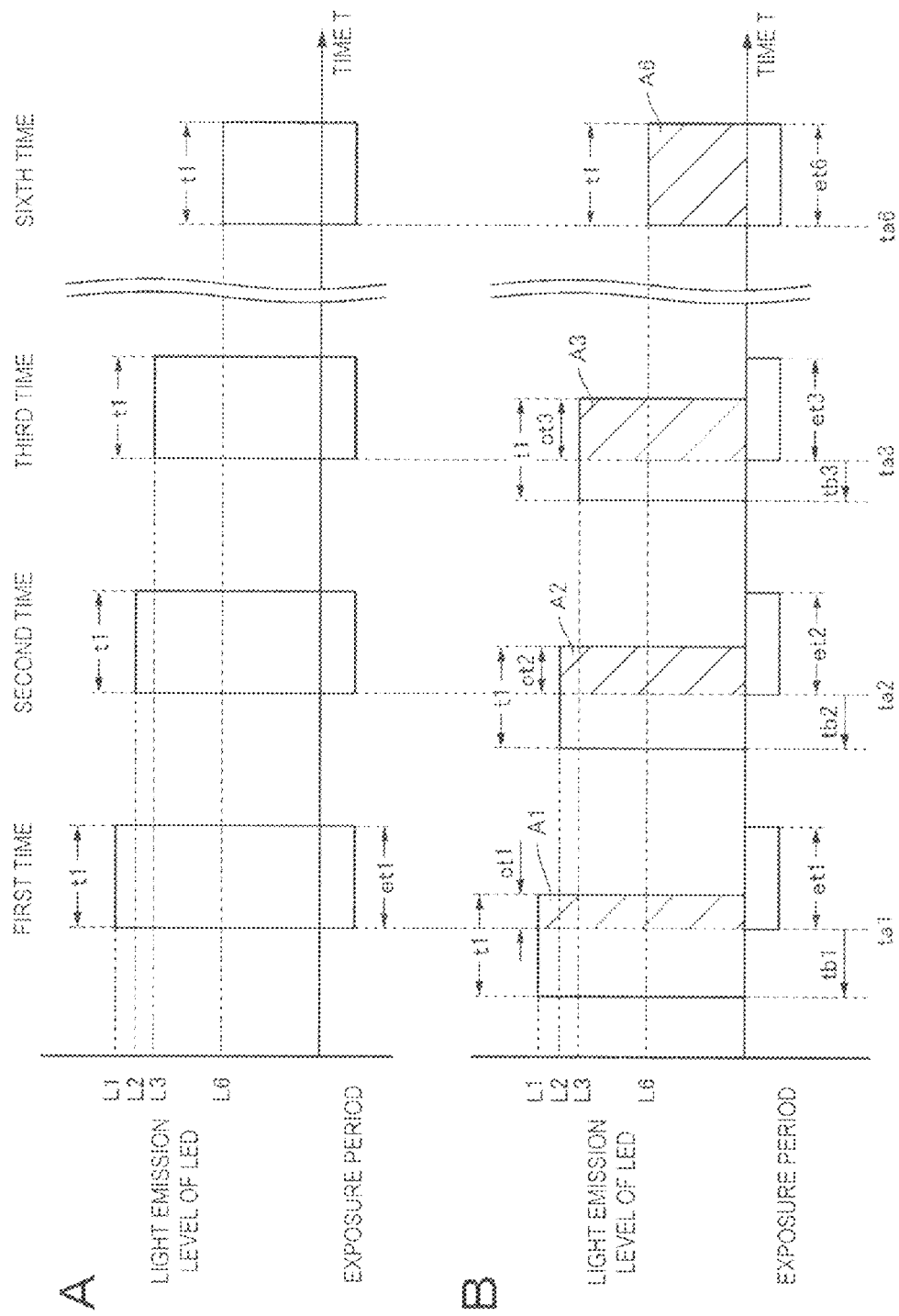
FIGS. 11A and 11B are diagrams for describing an example of a process in a first embodiment.

A specific example of operations will be described. FIG. 11A shows an example of the relationship between timings of light emission by the LED 111 and timings of exposure when a shift amount is 0. The LED 111 emits light at, for example, a time ta1, and an exposure operation starts at the time ta1 according to the light emission by the LED 111. The time ta1 is a time at which, for example, the shutter button is pressed, and the synchronized consecutive photographing is instructed. The LED 111 emits light for a time t1. The time t1 is, for example, 5 ms. The exposure operation is performed as the shutter 102c is driven by the drive mechanism 103 so that an exposure period becomes et1.

Once the shutter button is pressed, and the synchronized consecutive photographing is instructed, the LED 111 emits light at a predetermined light emission interval, and the exposure operation is performed. For example, the LED 111 emits light for the second time at a time ta2. For example, the LED 111 emits light for the third time at a time ta3. Thereafter, the LED emits light in the same manner, and for example, the LED 111 emits light for the sixth time at the time ta6. The light emission interval (for example, the period from the time ta1 to the time ta2) is decided in the range of, for example, 100 ms to 400 ms.

It is assumed that the light emission level of the LED 111 of the first emission is a light emission level L1, the light emission level of the LED 111 of the second emission is a light emission level L2, the light emission level of the LED 111 of the third emission is a light emission level L3, and the light emission level of the LED 111 of the sixth emission is a light emission level L6. As described above, the light emission level of an LED decreases due to heat generation as the number of times of light emission increases. In other words, the relationship of L1>L2>L3 . . . >L6 is satisfied. Since the exposure period et1 is fixed, brightness of an image obtained from the sixth imaging is lower than brightness of an image obtained from first imaging.

FIG. 11B shows an example of the relationship between timings of light emission of the LED 111 and timings of exposure when the timings of light emission by the LED 111 are shifted. In the first light emission by the LED 11, the timing at which the LED 111 starts light emission is shifted earlier from the time ta1 by a time tb1. It should be noted that shifting a timing to an earlier timing is appropriately referred to as early-shifting and shifting a timing to a later timing is appropriately referred to as a late-shifting. Furthermore, a period in which the light emission period t1 of the LED 111 overlaps the exposure period et1 of the imaging element 102e is referred to as an overlap period. The time tb1 corresponds to the shift amount of first light emission by the LED 111.

FIG. 11B shows that the overlap period when the LED 111 performs the first light emission is set to be ot1. The light amount effective for exposure in the first exposure operation is the result obtained by integrating the light emission level L1 with the overlap period ot1, which corresponds to the area of a region A1 to which diagonals are given. In the following second, third, fourth, fifth, and sixth light emissions by the LED, the timings of light emission by the LED 111 are shifted so that the light amount effective for exposure is substantially uniform in each imaging. It should be noted that "substantially uniform" includes the case in which the light amount effective for exposure is completely the same in each imaging.

It is better to shift only the timing of light emission by the LED 111 earlier, and thus it is unnecessary to change the light emission period t1 of the LED 111 and the exposure period et1 which are used as references. Therefore, more complicated control than in the related art is unnecessary, making control accurate and simple, and thus more easy.

In the second light emission of the LED 111, the timing of the light emission by the LED 111 is early-shifted from a time ta2 by a time tb2 as shown in the drawing. The light emission level by the LED 111 in the second light emission is lowered from the light emission level L1 to the light emission level L2. For this reason, a shift amount tb2 of the second light emission is set to be smaller than the shift amount tb1 of the first light emission. Accordingly, an overlap period ot2 is set to be longer than the overlap period ot1 of the first light emission by the LED 111.

A decreased mount of light emission level by the LED 111 serving as a reference can be acquired from, for example, values measured in advance. Thus, the light amount effective for exposure in the second light emission by the LED 111, i.e., the area of a region A2, can be set to be substantially the same as the region A1 by setting an appropriate shift amount.

In the same manner, in the third light emission by the LED 111, the timing of the light emission by the LED 111 is early-shifted from a time ta3 by a time tb3. Also in this case, the light amount effective for exposure in the third light emission by the LED 111, i.e., the area of a region A3, can be set to be substantially the same as the regions A1 and A2.

In the sixth light emission by the LED 111, the shift amount is set to be, for example, 0. Of course, it is not necessary to set the shift amount in the final light emission by the LED 111 to be 0.

By performing control as described above, the light amount effective for exposure in each imaging can be set to be substantially uniform. In other words, brightness of six images obtained from each imaging becomes substantially uniform, and irregularity seldom occurs. Even when the six images overlap, for example, one image of which noise is appropriately removed can be generated since irregularity in brightness thereof occurs little.

It should be noted that, in the control of FIGS. 11A and 11B, the timings of light emission by the LED 111 may be late-shifted. In the first light emission by the LED 111, for example, the start timing of the light emission by the LED 111 may be shifted later from the time ta1 by tb1.

Figure 12:
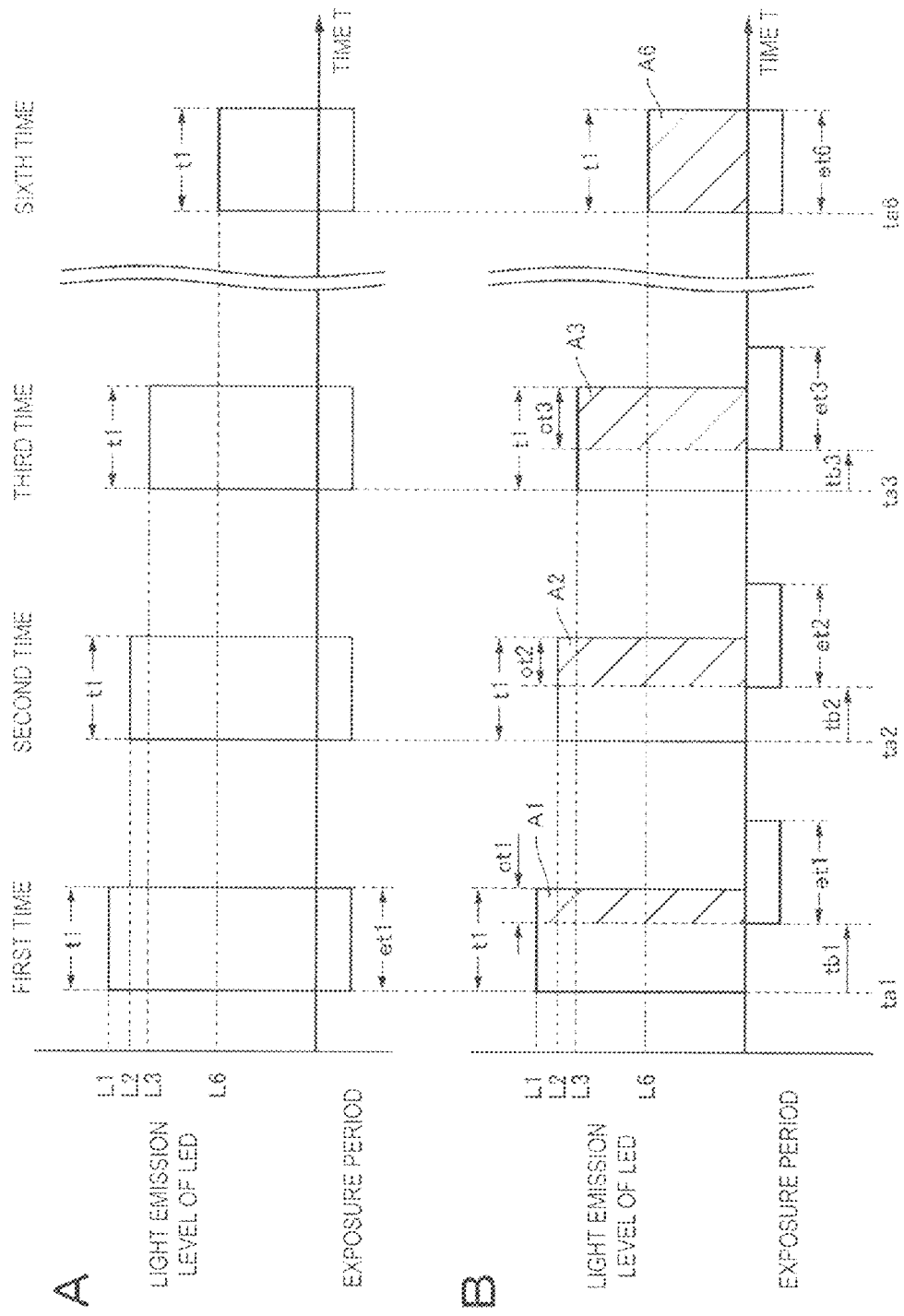
FIGS. 12A and 12B are diagrams for describing an example of another process in the first embodiment.

Furthermore, besides the timings of light emission by the LED 111, the timings of exposure may be shifted. FIG. 12A is a diagram showing an example of the relationship between the timings of light emission by the LED 111 and the timings of exposure when a shift amount is 0, which is the same drawing as FIG. 11A. As shown in FIG. 12B, a start timing of exposure may be shifted from the time ta1 by the time tb1. Even if the start timing of exposure is shifted, the light amount effective for exposure in each imaging can be set to be substantially uniform. It should be noted that although the start timing of exposure is late-shifted in FIG. 12B, it may of course be early-shifted.

[An Example of Shift Data]

Next, an example of shift data will be described. FIG. 13 shows an example of specifications during synchronized consecutive photographing by the imaging device 100. Exposure periods corresponding to shutter speeds are associated with light emission periods of an LED therein. Furthermore, a capture interval that is a period from the start timing of an exposure operation to the start timing of the next exposure operation is associated therewith. The total of intervals is a time necessary for one synchronized consecutive photographing, and defined by, for example, adding the result obtained by quintupling a capture interval to one exposure period.

It should be noted that, when imaging is performed in a dark environment such as for a night view, brightness in exposure is secured by decreasing a shutter speed. Conversely, when imaging is performed in a bright environment such as an outdoor place in a fine day, brightness in exposure is adjusted to be reduced by increasing a shutter speed.

FIG. 14 shows an example of shift data stored in the shift data storage unit 107. Shift data may be set for each specification shown in FIG. 13, but in order to simplify description, FIG. 14 shows an example of shift data corresponding to two patterns. In the first pattern, for example, the shutter speed is ⅟30 seconds, the capture imaging interval is 100 ms, and the capture interval is 100 ms. When synchronized consecutive photographing is performed in the first pattern, the light emission level of a sixth light emission by the LED 111 is lowered by, for example, approximately 30% from the light emission level of a first light emission. It should be noted that the decreased amount of the light emission level is obtained by performing synchronized consecutive photographing in advance based on, for example, the first pattern, and measuring the light emission levels.

As shown in FIG. 14, shift amounts and overlap periods corresponding to the first pattern are defined for each light emission by the LED 111. It should be noted that, although both the shift amounts and the overlap periods are defined, only one of these criteria may be defined.

In the same manner, shift data corresponding to a second pattern is defined. In the second pattern, for example, the shutter speed is ¼ seconds, the capture imaging interval is 100 ms, and the capture interval is 350 ms. When synchronized consecutive photographing is performed in the second pattern, the light emission level of a sixth light emission by the LED 111 is lowered by, for example, approximately 5% from the light emission level of a first light emission. It should be noted that the decreased amount of the light emission level is obtained by performing synchronized consecutive photographing in advance based on, for example, the second pattern, and measuring the light emission levels.

As shown in FIG. 14, shift amounts and overlap periods corresponding to the second pattern are defined for each light emission by the LED 111. It should be noted that, although both the shift amounts and the overlap periods are defined, only one of these criteria may be defined. It should also be noted that there is a case in which a shift amount is set to be 0 according to the degree of a decrease in a light amount of the LED 111. The overlap period in first imaging is set to be shorter than the overlap period in sixth imaging.

FIGS. 15A and 15B are diagrams for describing timing shifts when synchronized consecutive photographing is performed according to the first pattern. They are diagrams for describing timing shifts in each one exposure period in consecutive photographing for a scene photographed with night illumination, for example, on a shopping street or in a restaurant. FIGS. 15A and 15B are diagrams in which the timings of light emission by the LED 111 are late-shifted. FIG. 15A shows a timing shift in a first light emission by the LED 111. The timing of light emission by the LED 111 is late-shifted by 1.5 ms. An overlap period in which the light emission period of the LED 111 overlaps the exposure period is 3.5 ms. It should be noted that a drive current per LED element of the LED 111 is set to be, for example, 8 A. In the first light emission, the light emission level per LED element of the LED 111 is, for example, 2400 lm (lumens).

FIG. 15B shows a timing shift in sixth light emission by the LED 111. In the sixth light emission, the light emission level of the LED 111 decreases by, for example, 30%, becoming 1680 lm. According to the decrease of the light emission level of the LED 111, the shift amount is reduced, and the overlap period is lengthened. In the sixth light emission, the shift amount is set to 0 and the overlap period is set to 5.0 ms.

FIGS. 16A and 16B are diagrams for describing timing shifts when synchronized consecutive photographing is performed according to the second pattern. They are diagrams for describing timing shifts in each one exposure period in consecutive photographing for a scene photographed in, for example, complete darkness with no streetlight at night such as in a countryside. FIGS. 16A and 16B are diagrams in which the timings of light emission by the LED 111 are late-shifted.

FIG. 16A shows a timing shift in a first light emission by the LED 111. The timing of light emission by the LED 111 is late-shifted by 0.2 ms. An overlap period in which the light emission period of the LED 111 overlaps the exposure period is 4.8 ms. It should be noted that a drive current per LED element of the LED 111 is set to be, for example, 8 A. In the first light emission, the light emission level per LED element of the LED 111 is, for example, 2400 lm (lumens).

FIG. 16B shows a timing shift in sixth light emission by the LED 111. In the sixth light emission, the light emission level per LED element of the LED 111 decreases by, for example, 5%, becoming 2280 lm. According to the decrease of the light emission level of the LED 111, the shift amount is reduced, and the overlap period is lengthened. In the sixth light emission, the shift amount is set to 0 and the overlap period is set to 5.0 ms.

Along with a capture imaging interval being lengthened, a light emission interval of the LED 111 is lengthened. For this reason, heat dissipation of the LED 111 progresses, and reduction of the light emission level of the LED 111 is alleviated. In such a case, since the light emission levels of the LED 111 in each light emission are substantially uniform, the shift amount may be small. The shift amount may be 0.

FIG. 17 shows another example of specifications during synchronized consecutive photographing of the imaging device 100. In this example, the light emission periods of the LED 111 are set to be, for example, 10 ms. It should be noted that, in the fields to which hatching is given, the shutter speeds are high, and the exposure periods are shorter than the light emission periods of the LED 111. In other words, since the shutter speeds are higher than a synchronous speed, the LED 111 emits no light.

FIG. 18 is an example of shift data corresponding to the above example of the specifications of the imaging device 100. It should be noted that the setting of imaging and the rate of a decrease in a light amount of the LED 111 are the same as in the first and second patterns described above. As shown in FIG. 18, as the light emission period of the LED 111 is doubled, the shift amount is doubled or substantially doubled. The same applies to the overlap period.

FIGS. 19A and 19B are diagrams for describing timing shifts when synchronized consecutive photographing is performed in the case in which setting of imaging corresponds to the first pattern and the light emission period of the LED 111 is 10 ms. They are diagrams for describing timing shifts in each one exposure period of synchronized consecutive photographing for a scene of, for example, a bright street at night. Although the timings of light emission by the LED 111 are late-shifted in FIGS. 19A and 19B, they may be early-shifted. The timings of the exposure period may be shifted.

FIG. 19A shows a timing shift in first light emission by the LED 111. The timing of light emission by the LED 111 is late-shifted by 3.0 ms. An overlap period in which the light exposure period of the LED 111 overlaps the exposure period is set to be 7.0 ms. It should be noted that a drive current per LED element of the LED 111 is set to be, for example, 5 A. In the first light emission, the light emission level per LED element of the LED 111 is, for example, 1500 lm (lumens).

FIG. 19B shows a timing shift in sixth light emission by the LED 111. In the sixth light emission, the light emission level per LED element of the LED 111 decreases by, for example, 30%, becoming 1050 lm. As the light emission level of the LED 111 decreases, the shift amount becomes small, and the overlap period is lengthened. In the sixth light emission, the shift amount is 0, and the overlap period is 10.0 ms.

Figure 20:
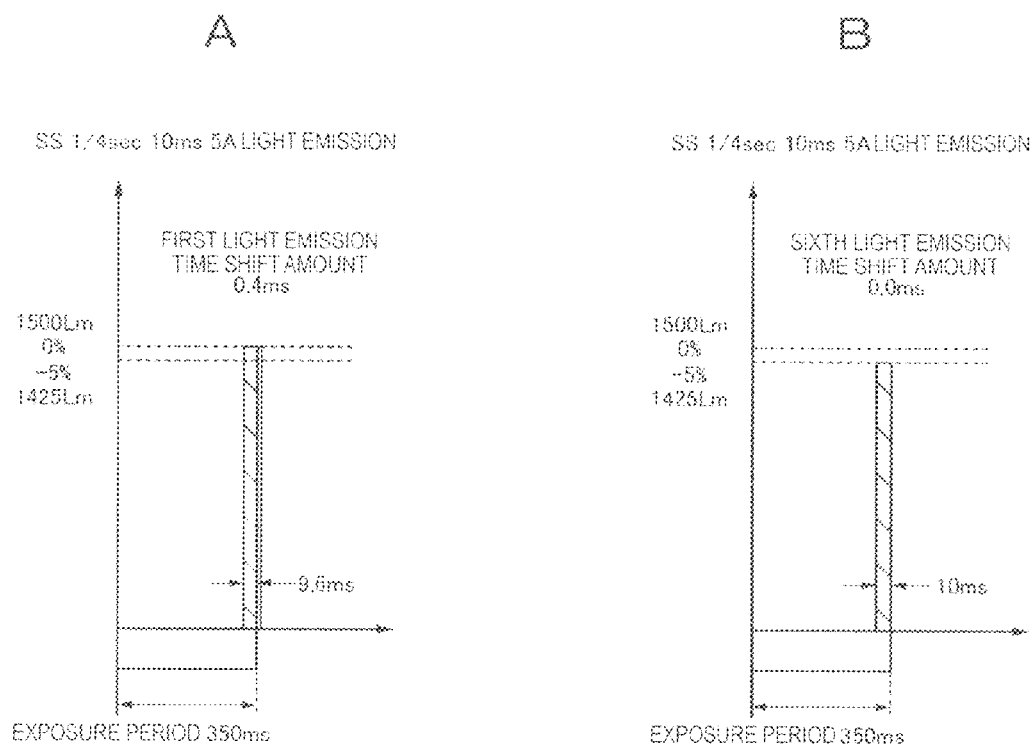
FIGS. 20A and 20B are diagrams for describing processes in which consecutive photographing is executed to photograph a scene in, for example, complete darkness based on a shift amount in one exposure period; HG. 21 is a diagram for describing the flow of a process in the first embodiment.

FIGS. 20A and 20B are diagram for describing timing shifts when synchronized consecutive photographing is performed in the case in which setting of imaging corresponds to the second pattern, and the light emission period of the LED 111 is 10 ms. FIGS. 20A and 20B y are diagrams for describing timing shifts in each one exposure period of synchronized consecutive photographing for a scene of, for example, complete darkness. In FIGS. 20A and 20B, the timings of light emission by the LED 111 are late-shifted, but may be early-shifted. The timings of the exposure period may be shifted.

FIG. 20A shows a timing shift in first light emission by the LED 111. The timing of light emission by the LED 111 is late-shifted by 0.4 ms. An overlap period in which the light exposure period of the LED 111 overlaps the exposure period is set to be 9.6 ms. It should be noted that a drive current per LED element of the LED 111 is set to be, for example, 5 A. In the first light emission, the light emission level per LED element of the LED 111 is, for example, 1500 lm (lumens).

FIG. 20B shows a timing shift in sixth light emission by the LED 111. In the sixth light emission, the light emission level per LED element of the LED 111 decreases by, for example, 5%, becoming 1425 lm. As the light emission level of the LED 111 decreases, the shift amount becomes small, and the overlap period is lengthened. In the sixth light emission, the shift amount is set to 0, and the overlap period is set to 10.0 ms.

Along with a capture imaging interval being lengthened, a light emission interval of the LED 111 is lengthened. For this reason, heat dissipation of the LED 111 proceeds, and reduction of the light emission level of the LED 111 is alleviated. In such a case, since the light emission levels of the LED 111 in each light emission are substantially uniform, the shift amount may be small. The shift amount may be set to 0.

[A Flow of a Process]

Figure 21:
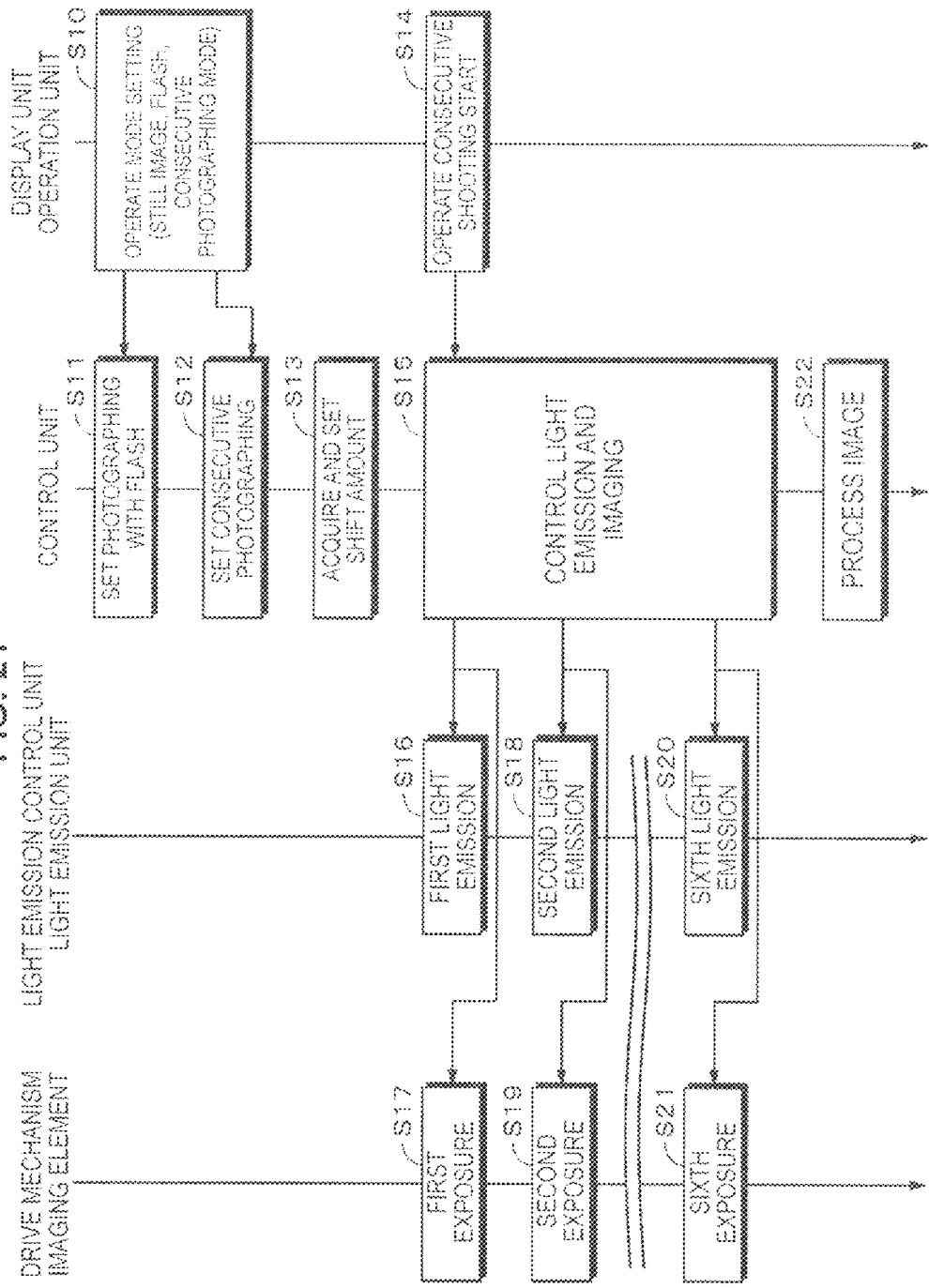

FIG. 21 is a flowchart showing an example of a flow of a process. First, in Step S10, a mode in which imaging is performed with the LED 111 consecutively emitting light a plurality of times is set using a screen displayed on the display unit 106. For example, setting is made for turning on the still image mode, the flash mode, and the consecutive photographing mode. It should be noted that, in Step S10, the handheld night view mode may be set as a photographing mode. Then, the process proceeds to Steps S11 and S12.

Operation signals corresponding to operations for the settings are supplied to the control unit 101 from the display unit 106. In Step S11, the control unit 101 performs setting for flash and for consecutive photographing according to the operation signals. In Step S12, the control unit 101 performs setting for consecutive photographing. Then, the process proceeds to Step S13.

In Step S13, the timing control part 101c of the control unit 101 acquires shift data from the shift data storage unit 107. For example, a shutter speed is set according to brightness of a subject, and a shift amount corresponding to the shutter speed is read from the shift data storage unit 107. It should be noted that the shutter speed may be automatically set, or manually set by a user of the imaging device 100. However, a shutter speed higher than a synchronous speed should not be set. The timing control part 101c sets the read shift amount for the drive control part 101d. The control unit 101 awaits a consecutive shooting start operation to be performed for the operation unit 105. Then, the process proceeds to Step S14.

In Step S14, the consecutive shooting start operation is performed. For example, the shutter button is pressed. An operation signal corresponding to the consecutive shooting start operation is supplied from the operation unit 105 to the control unit 101. Then, the process proceeds to Step S15.

In Step S15, the drive control part 101d of the control unit 101 causes the LED 111 to consecutively emit light a plurality of times, and controls to perform imaging. The drive control part 101d supplies the drive control signal S1 to the drive mechanism 103. According to the drive control signal S1, the drive mechanism 103 controls the shutter 102c to open and close, and thereby a first exposure operation is performed. Further, the drive control part 101d supplies the light emission control signal S2 to the light emission control unit 110. According to the light emission control signal S2, the light emission control unit 110 is operated, and thereby the LED 111 performs first light emission (Steps S16 and S17).

Control by the drive control part 101d is repeated, and a second exposure operation and second light emission by the LED 111 are performed (Steps S18 and S19). Exposure operations and light emission by the LED 111 are performed, for example, six times.

As described above, the drive control part 101d controls at least one of timings of exposure and timings of light emission so that the light amounts effective for exposure in imaging six times are substantially the same. It should be noted that, in order to simplify control, it is preferable to control timings of either exposure or of light emission. For example, the drive control part 101d shifts the timing at which the drive control signal S1 is supplied to the drive mechanism 103 earlier or later than a reference timing based on a shift amount. Based on the shift amount, the timing at which the light emission control signal S2 is supplied to the light emission control unit 110 may be shifted earlier or later than a reference timing.

It should be noted that image data of six images obtained from six times of imaging is temporarily stored in a buffer memory. Then, the process proceeds to Step S22.

In Step S22, a predetermined image process is performed. In the synchronized consecutive photographing mode, for example, the predetermined image process is implemented on each piece of the image data of the six images, and the image data of the six images is supplied to the storage unit 109. In the handheld night view mode, for example, a process for combining the image data of the six images is performed. The image processes are performed by, for example, the image processing part 101a of the control unit 101.

[Regarding the Handheld Night View Mode]

Herein, an example of the handheld night view mode to which the present technology can be applied will be described. First, the photographing mode is set to be the handheld night view mode. Then, the shutter button is half pressed, and exposure in the system of the imaging device 100 is controlled. Here, sensitivity (gain) and a shutter speed are set. For example, a shutter speed is selected in the range of 1/30 seconds and 1/4 seconds, and the selected shutter speed is set. When the setting is completed, imaging is performed based on the handheld night view mode.

Figure 22:
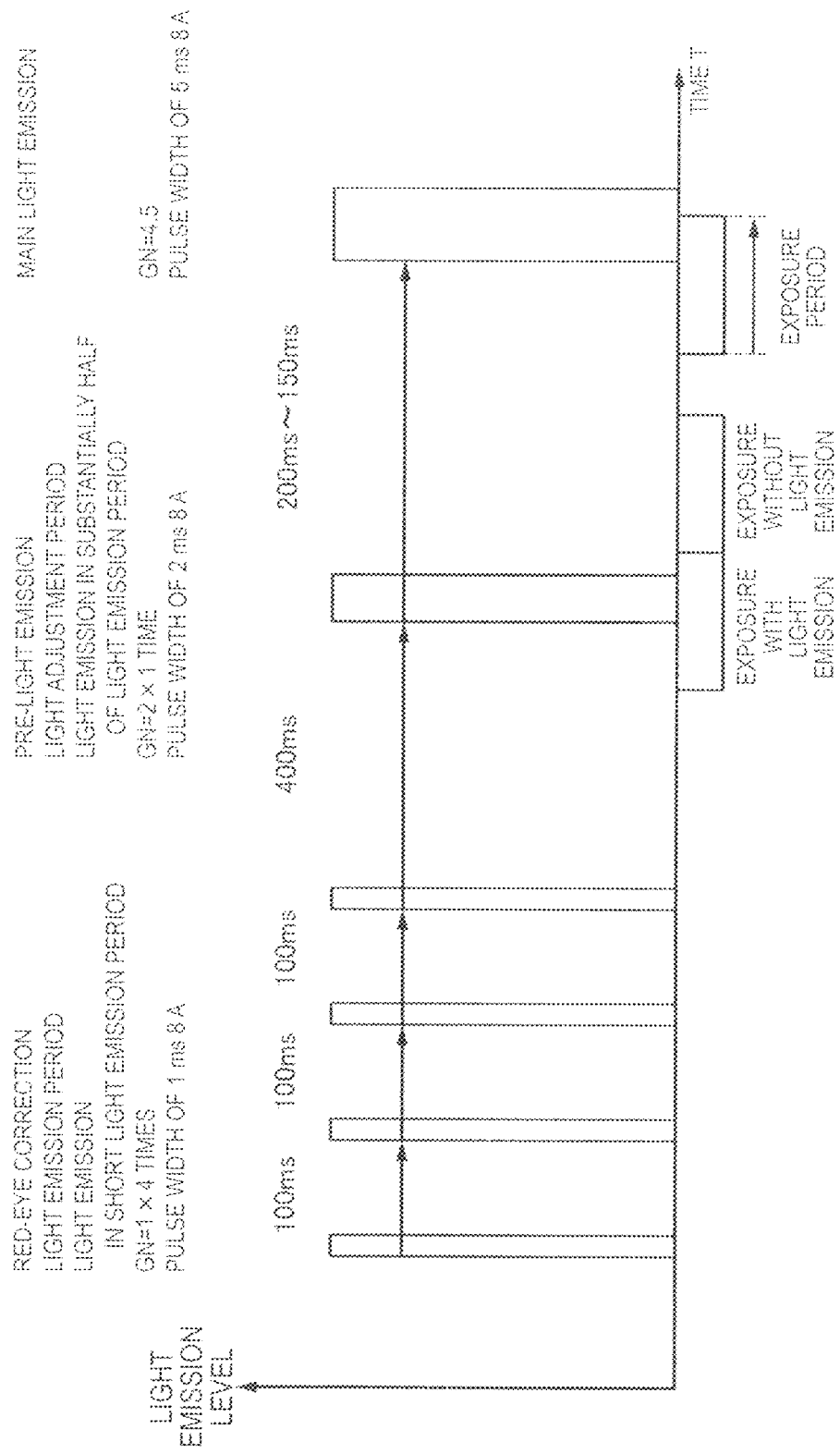
FIG. 22 is a diagram for describing a series of timings of an imaging process using one exposure at a shutter speed synchronous with red-eye correction light emission, pre-light emission, and one-time light emission and current drive control per LED, exemplifying general portrait photography such as in a handheld night view mode.

FIG. 22 is a diagram for describing a flow of exposure at a shutter speed synchronous with red-eye correction light emission, pre-light emission, one light emission and timings thereof, exemplifying a portrait photography at night using general flash including the handheld night view mode. First, light emission for correcting red-eye is performed, for example, four times. For example, by driving the LED with a pulse width of 1 ms, and a drive current of 8 A per LED element, the LED 111 emits light four times. A light emission interval of each time is set to be, for example, 100 ms. The eyes of a human who is a subject react to the light emission, and the diameters of the irises of the pupils reduce due to glare, and thus red reflection on the retina is reduced.

Pre-light emission is performed after, for example, about 400 ms elapses from the fourth light emission for correcting red-eye. According to light adjustment control accompanied by the pre-light emission, the light amount of main light emission by the LED 111 after the pre-light emission is decided. According to the light adjustment control, the LED 111 is caused to emit light by, for example, fixing ISO sensitivity to 100, and setting a guide number to be 2, a pulse width to be 2 ms, and a drive current to be 8 A per LED element. Exposure is performed one time at a shutter speed of 1/100, and further, in the state with no light emission by the LED 111, exposure is performed one time at the shutter speed of 1/100. The light amount of the LED 111 is adjusted according to brightness of (external light around) the subject.

After, for example, 200 ms to 150 ms from the light adjustment control in the pre-light emission, the LED 111 performs the main light emission in the light amount decided in the light adjustment. For example, the LED 111 emits light with a guide number of 4.5, a pulse width of 5 ms, and a drive current of 8 A per LED element. The LED 111 consecutively performs the main light emission, for example, six times. During the main light emission, at least one timing of exposure or light emission is appropriately controlled. Since the light amounts in each imaging effective for exposure are substantially the same while the shutter speed is low and the exposure period is lengthened, the brightness of the image data of the six images can be substantially uniform.

It should be noted that, since the intervals of drive current between light emission for red-eye correction, the pre-light emission, and the main light emission differ by several times, a sufficient, or at least a more sufficient, interval is set in heat generation caused by the light emission for red-eye correction and the pre-light emission. For this reason, heat of the LED 111 generated from the light emission for red-eye correction and the pre-light emission can be dissipated, and when the main light emission is started, the LED 111 returns to the initial state (in which it is not affected by heat generation).

In photographing in the handheld night view mode, image data of six images photographed at the same brightness are overlapped, and image data of one image is obtained using light emission synchronous with each exposure at a predetermined shutter speed. Noise of the obtained image data is ⅙ of the original data, and brightness of the image data is the sixth root of six (1.348 times).

<2. Second Embodiment>

Next, a second embodiment will be described. A configuration of the imaging device 100 in the second embodiment is the same as in the first embodiment, and thus overlapping description will not be repeated. The control unit 101 of the imaging device 100 in the second embodiment controls the amount of light reaching the imaging element 102e.

Figure 23:
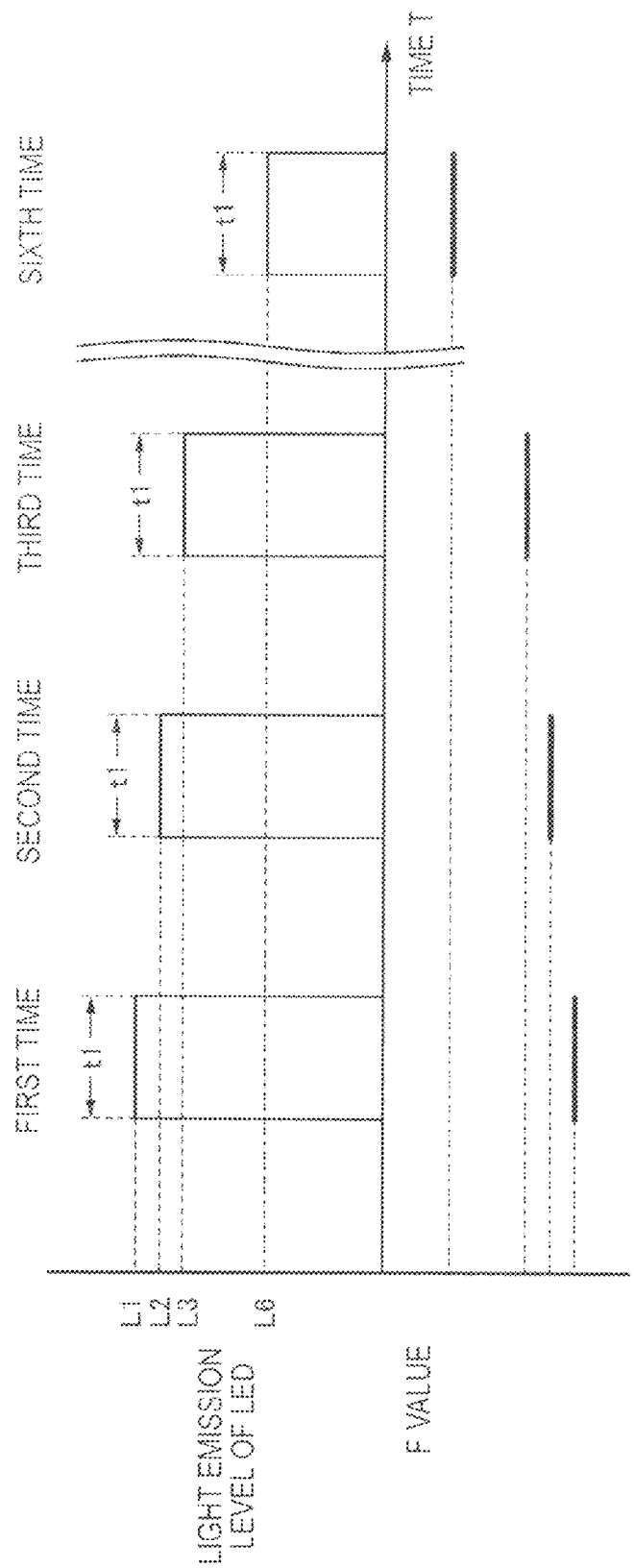
FIG. 23 is a diagram for describing an example of a process in a second embodiment.

As shown in FIG. 23, the control unit 101 controls an F value to decrease along with an increase in the number of times of imaging (the number of times of light emission). Accordingly, a decrease in the light emission level of the LED 111 can be compensated.

Herein, performance of a zoom operation when synchronized consecutive photographing is performed will be considered. It is necessary to control F values in each time of imaging in the synchronized consecutive photographing corresponding to the zoom operation. As an example, when an F value can be set in the range of F11 that is the darkest F value to F5.0 that is the brightest F value on the telescopic end side of a zoom lens, the F value in sixth imaging is set to 5.0 that is the F value of the telescopic end. Having the F value of 5.0 as a reference, F values in imaging times prior to the sixth imaging are appropriately set. It should be noted that the F values of each time corresponding to the F value of the sixth imaging are 1.0 stored as, for example, a table.

When a diaphragm is mechanically controlled while synchronized consecutive photographing is performed, noise is a concern. Thus, it is desirable to electronically control F values using the ND filter 102d.

Figure 24:
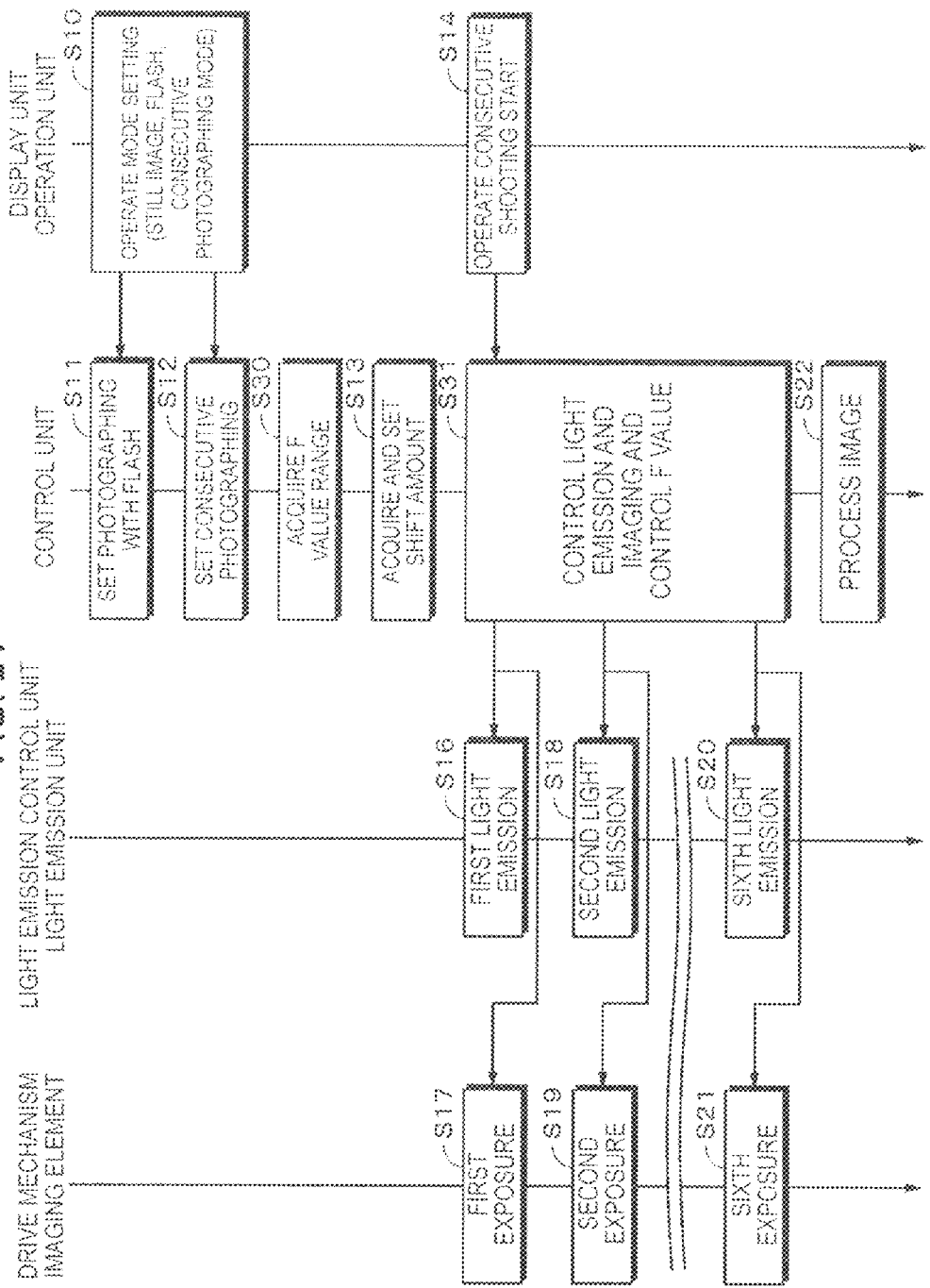
FIG. 24 is a diagram for describing the flow of a process in the second embodiment.

FIG. 24 shows a flow of a process in the second embodiment. The process of the second embodiment may be performed in combination with the process of the first embodiment, or may be singly performed. FIG. 24 shows an example of the process performed in combination with the process of the first embodiment.

Differences from the first embodiment are the processes of Steps S30 and S31. Hereinafter, description will be provided focusing on these processes. In Step S30, a current position of a zoom lens and the range of F values during zoom are acquired. For example, the control unit 101 sets the F value of the telescopic end as the F value in sixth imaging, and then sets F values of each time of imaging.

In Step S31, a plurality of times of light emission and imaging control are performed, and a control to attenuate the F values is executed according to the increase of the number of times of imaging. With the control to attenuate the F values, irregularity in brightness between images according to decrease in the light emission levels of the LED 111 can be prevented. Since other processes are the same as the processes of the first embodiment, overlapping description thereof will be omitted.

<3. Modified Example>

Hereinabove, the embodiments of the present technology have been described, but the present technology is not limited to the above-described embodiments, and can be modified variously. In the embodiments described above, the LED 111 is described as the two-light structure including two LED elements, but can employ a structure in which only one LED element is included (one-light structure), or three or more LED elements according to condition of the system of the imaging device. The above-described present technology can be applied in such a case as well.

As described above, when the light emission level of an LED decreases due to heat generation, the color temperature shifts to a higher level. For this reason, there is concern of an obtained captured image becoming bluish. Thus, a proper color correction process may be performed when a color temperature of flash light of the LED is high. This process is performed by, for example, the image processing part 101a of the control unit 101.

Furthermore, a region in which a color correction process is performed may be set in image data. The color correction process may be performed by specifying a subject that is positioned a short distance from a current position of a zoom lens within the range of an angle of view of photographing based on distance information (depth map) used in, for example, auto-focus control, or the like. Since flash light of an LED does not reach a subject positioned at a remote distance, the color correction process is unnecessary. It should be noted that a short distance and a remote distance can be defined, for example, according to the level of a threshold value by setting the threshold value with respect to a depth map.

In the embodiments described above, an exposure period is set to be controlled by mechanically controlling the shutter, but an exposure period may be controlled using the function of an electronic shutter.

Furthermore, the present technology is not limited to a device, and can be realized as a method, a program, or a recording medium.

It should be noted that the configurations and the processes shown in the embodiments and the modified examples can be appropriately combined within the scope in which a technical contradiction does not arise. The orders of each of the processes in the exemplified processing flows can be appropriately changed within the scope in which a technical contradiction does not arise.

The present technology can also be applied to a so-called cloud system in which the exemplified processes are performed by a plurality of devices in a distributed manner. The present disclosure can be realized as a system that executes the processes exemplified in the embodiments and the modified examples, which is a device that executes at least some of the exemplified processes.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An imaging device including:
an imaging element that acquires a captured image of a subject;
a light emission unit that emits light to the subject; and
a control unit that is capable of controlling a timing of exposure performed by the imaging element and a timing of light emission performed by the light emission unit,
wherein, in a mode in which imaging is performed with a plurality of times of consecutive light emission by the light emission unit, the control unit controls at least one of a timing of the exposure and a timing of the light emission so that light amounts effective for exposure in each imaging are substantially identical.

(2) The imaging device according to (1), wherein the control unit shifts a start timing of the exposure to a reference timing so that light amounts effective for exposure in each imaging are substantially identical.

(3) The imaging device according to (1) or (2), wherein the control unit shifts a start timing of the light emission to a reference timing so that light amounts effective for exposure in each imaging are substantially identical.

(4) The imaging device according to any one of (1) to (3), further including:
a shift data storage unit that stores a shift amount of the timing according to setting of the imaging.

(5) The imaging device according to any one of (1) to (4),
wherein the plurality of times is N times (where N is an integer equal to or higher than 2), and
wherein the control unit controls at least one of the timing of the exposure and the timing of the light emission so that an overlap period in which a period of the exposure and a period of the light emission in a first light emission overlap is shorter than an overlap period in a N-th light emission.

(6) The imaging device according to any one of (1) to (5), further including:
a color correction processing unit that corrects a change in color temperature accompanied by a decrease in a light amount of the light emission unit.

(7) The imaging device according to any one of (1) to (6), further including:
an imaging combination unit that combines a plurality of pieces of image data obtained in the plurality of times of imaging.

(8) The imaging device according to any one of (1) to (7),
wherein the light emission unit is configured as a light emitting diode (LED).

(9) An imaging device including:
an imaging element that acquires a captured image of a subject;
a light emission unit that emits light to the subject; and
a control unit that controls an amount of light reaching an imaging plane of the imaging element,
wherein, in a mode in which imaging is performed with a plurality of times of consecutive light emission by the light emission unit, the control unit controls the amount of light to increase as a number of times of imaging increases.

(10) A control method of an imaging device,
wherein, in a mode in which imaging is performed with a plurality of times of consecutive light emission by a light emission unit, at least one of a timing of exposure and a timing of light emission is controlled so that light amounts effective for exposure in each imaging are substantially identical.

(11) A control method of an imaging device,
wherein, in a mode in which imaging is performed with a plurality of times of consecutive light emission by a light emission unit, an amount of light reaching an imaging plane of an imaging element is controlled to increase as a number of times of imaging increases.

The present disclosure contains subject matter related to that disclosed in Japanese Priority Patent Application JP 2012-192571 filed in the Japan Patent Office on Aug. 31, 2012, the entire content of which is hereby incorporated by reference.

What is claimed is:

1. An imaging device comprising:
an imaging element that acquires a captured image of a subject; and
a control unit that is capable of controlling a timing of exposure performed by the imaging element and a timing of light emission performed by a light emission unit,
wherein, in a mode in which imaging is performed with a plurality of times of consecutive light emission by the light emission unit, the control unit controls at least one of the timing of the exposure and the timing of the light emission, and
wherein the control unit shifts a start timing of the exposure to a reference timing so that light amounts effective for exposure in each imaging are substantially identical.

2. The imaging device according to claim 1, wherein the control unit shifts a start timing of the light emission to a reference timing so that light amounts effective for exposure in each imaging are substantially identical.

3. The imaging device according to claim 1, further comprising: a shift data storage unit that stores a shift amount of the timing according to setting of the imaging.

4. The imaging device according to claim 3, wherein the shift amount of the timings are defined in a table.

5. The imaging device according to claim 1, wherein the plurality of times is N times (where N is an integer equal to or higher than 2), and wherein the control unit controls at least one of the timing of the exposure and the timing of the light emission so that an overlap period in which a period of the exposure and a period of the light emission in a first light emission overlap is shorter than an overlap period in a N-th light emission.

6. The imaging device according to claim 1, further comprising:
a color correction processing unit that corrects a change in color temperature accompanied by a decrease in a light amount of the light emission unit.

7. The imaging device according to claim 1, further comprising:
an imaging combination unit that combines a plurality of pieces of image data obtained in the plurality of times of imaging.

8. The imaging device according to claim 1, wherein the light emission unit is configured as a light emitting diode (LED).

9. The imaging device according to claim 1, wherein the control unit controls an F value to decrease with an increase in a number of times of imaging.

10. An imaging device comprising:
an imaging element that acquires a captured image of a subject; and
a control unit that controls an amount of light reaching an imaging plane of the imaging element, wherein, in a mode in which imaging is performed with a plurality of times of consecutive light emission by a light emission unit, the control unit controls an F value to decrease with an increase in a number of times of imaging.

11. A control method of an imaging device,
wherein, in a mode in which imaging is performed with a plurality of times of consecutive light emission by a light emission unit, at least one of a timing of exposure and a timing of light emission is controlled by shifting a start timing of the exposure to a reference timing so that light amounts effective for exposure in each imaging are substantially identical.

12. A control method of an imaging device,
wherein, in a mode in which imaging is performed with a plurality of times of consecutive light emission by a light emission unit, an F value is controlled to decrease with an increase in a number of times of imaging.

13. An imaging device comprising:
an imaging element that acquires a captured image of a subject; and
a control unit that is capable of controlling a timing of exposure performed by the imaging element and a timing of light emission performed by a light emission unit,
wherein, in a mode in which imaging is performed with a plurality of times of consecutive light emission by the light emission unit, the control unit controls at least one of the timing of the exposure and the timing of the light emission so that light amounts effective for exposure in each imaging are substantially identical,
wherein the plurality of times is N times (where N is an integer equal to or higher than 2), and
wherein the control unit controls at least one of the timing of the exposure and the timing of the light emission so that an overlap period in which a period of the exposure and a period of the light emission in a first light emission overlap is shorter than an overlap period in a N-th light emission.

* * * * *